US012260676B2

(12) United States Patent
Ohno

(10) Patent No.: US 12,260,676 B2
(45) Date of Patent: Mar. 25, 2025

(54) IMAGE PROCESSING METHOD, IMAGE PROCESSING DEVICE, AND NON-TRANSITORY COMPUTER READABLE STORAGE MEDIUM

(71) Applicants: Swallow Incubate Co., Ltd., Ibaraki (JP); Panasonic Corporation, Osaka (JP)

(72) Inventor: Toshikazu Ohno, Ibaraki (JP)

(73) Assignees: SWALLOW INCUBATE CO., LTD., Ibaraki (JP); PANASONIC HOLDINGS CORPORATION, Osaka (JP)

(*) Notice: Subject to any disclaimer, the term of this patent is extended or adjusted under 35 U.S.C. 154(b) by 549 days.

(21) Appl. No.: 17/527,382

(22) Filed: Nov. 16, 2021

(65) Prior Publication Data

US 2022/0075983 A1    Mar. 10, 2022

Related U.S. Application Data

(63) Continuation of application No. PCT/JP2020/004549, filed on Feb. 6, 2020.

(30) Foreign Application Priority Data

Sep. 13, 2019  (JP) ................................ 2019-167213

(51) Int. Cl.
G06V 40/18      (2022.01)
G06T 7/73       (2017.01)
G06V 40/19      (2022.01)

(52) U.S. Cl.
CPC .............. G06V 40/193 (2022.01); G06T 7/73 (2017.01); G06V 40/19 (2022.01); G06V 40/197 (2022.01); G06T 2207/10048 (2013.01)

(58) Field of Classification Search
CPC ........................................................ G06T 7/73
See application file for complete search history.

(56) References Cited

U.S. PATENT DOCUMENTS 9,846,807 B1 * 12/2017 Mayer ................... G06V 10/82
10,089,525 B1 * 10/2018 Mayer .................. G06V 10/764
(Continued)

FOREIGN PATENT DOCUMENTS

CN      104809458       7/2015
CN      109774722       5/2019
(Continued)

OTHER PUBLICATIONS

International Search Report issued Mar. 17, 2020 in International (PCT) Application No. PCT/JP2020/004549.

*Primary Examiner* — Edward Park
(74) *Attorney, Agent, or Firm* — Wenderoth, Lind & Ponack, L.L.P.

(57) ABSTRACT

An image processing method includes: acquiring image data; detecting a face region including at least a part of a face of a person from the image data; setting a first region used for detection of an eye of the person in the face region having been detected; setting a second region estimated to include a pupil or an iris by narrowing the first region based on a predetermined criterion; detecting pupil information indicating the pupil or the iris in the second region; and outputting the pupil information having been detected.

15 Claims, 17 Drawing Sheets

(56) References Cited

U.S. PATENT DOCUMENTS

| | | | | |
|---|---|---|---|---|
| 2005/0031173 A1* | 2/2005 | Hwang | ............... | G06V 40/18 382/118 |
| 2010/0182456 A1* | 7/2010 | Kim | ............... | H04N 19/115 348/231.6 |
| 2013/0170754 A1* | 7/2013 | Tsukizawa | ............ | G06V 40/19 382/195 |
| 2013/0178287 A1* | 7/2013 | Yahav | ............... | G02B 27/01 463/32 |
| 2014/0029794 A1* | 1/2014 | Zukowski | ........... | G06V 40/19 382/103 |
| 2014/0055342 A1* | 2/2014 | Kamimura | .......... | G06V 40/193 345/156 |
| 2016/0063305 A1* | 3/2016 | Matsunaga | ......... | G06V 40/193 382/167 |
| 2016/0066782 A1 | 3/2016 | Kimura et al. | | |
| 2016/0125241 A1* | 5/2016 | Ebisawa | ............. | G06T 7/77 348/78 |
| 2018/0144179 A1 | 5/2018 | Hatakeyama et al. | | |
| 2019/0126821 A1* | 5/2019 | Ho | ................ | G06V 20/582 |
| 2019/0147270 A1 | 5/2019 | Aoi et al. | | |
| 2019/0172222 A1 | 6/2019 | Ebisawa | | |
| 2020/0293754 A1* | 9/2020 | Huang | ............... | G06F 3/013 |
| 2021/0026445 A1* | 1/2021 | Stoner | ............... | G06F 3/015 |
| 2022/0075983 A1* | 3/2022 | Ohno | ............... | G06V 40/193 |

FOREIGN PATENT DOCUMENTS

| | | |
|---|---|---|
| CN | 109933723 | 6/2019 |
| JP | 2005-296382 | 10/2005 |
| JP | 2008-129665 | 6/2008 |
| JP | 2008-210239 | 9/2008 |
| JP | 2013-154458 | 8/2013 |
| JP | 2016-206885 | 12/2016 |
| JP | 2018-88236 | 6/2018 |
| WO | 2015/136908 | 9/2015 |
| WO | 2018/030515 | 2/2018 |

* cited by examiner

1B

IMAGE PROCESSING METHOD, IMAGE PROCESSING DEVICE, AND NON-TRANSITORY COMPUTER READABLE STORAGE MEDIUM

TECHNICAL FIELD

The present disclosure relates to a technique of detecting pupil information indicating a pupil or an iris.

BACKGROUND ART

The eye gaze detection technique is used in various applications such as estimation of a person's interest target, estimation of a person's state such as drowsiness, and a user interface that performs input to equipment by an eye gaze. The eye gaze detection technique is roughly divided into a bead-mounted type and a non-contact type. The head-mounted type eye gaze detection technique is a technique of detecting an eye gaze by mounting a device such as a head-mounted display on the head of a person. The non-contact type eye gaze detection technique is a technique of detecting an eye gaze without mounting a device to a person. The non-contact type eye gaze detection technique does not require attachment of a device to the head unlike the head-mounted type eye gaze detection technique. Hence, there are advantages such as not annoying a person and not blocking the field of view of a person. Therefore, the present disclosure focuses on the non-contact type eye gaze detection technique.

Here, the non-contact type eye gaze detection technique is roughly divided into two methods of a pupillary and corneal reflection method and a method using a three-dimensional eyeball model. The pupillary and corneal reflection method is a method of irradiating human eyes with light-emitting diodes (LED), and detecting an eye gaze by a position of a reflection image projected on the eyes, an irradiation angle of the LED, a movement amount of the position of the reflection image, and the like.

The method using the three-dimensional eyeball model is, for example, a method of estimating, as an eye gaze direction, a three-dimensional vector connecting an eyeball center position and an iris center position obtained by analyzing a face image, and estimating, as an eye gaze direction, a normal to a tangent plane of a pupil center position.

Here, in the non-contact type eye gaze detection technique, there is a problem that it is difficult to detect an eye gaze of a person wearing glasses. In order to solve this problem, Patent Literature 1 discloses a technique of determining whether or not a person wears glasses, detecting an eye gaze by a pupillary and corneal reflection method if the person does not wear the glasses, and detecting the eye gaze by a method using the three-dimensional eyeball model if the person wears the glasses.

However, in Patent Literature 1, when detecting the eye gaze using the three-dimensional eyeball model, merely the recognition processing such as feature amount calculation and shape determination in which the face or the eyeball of the driver is set as the detection target from the image data of the visible light image is performed (paragraph 0014), and recognition processing in consideration of the presence of the glasses is not performed. Therefore, in Patent Literature 1, there is a possibility that the glasses are detected as a pupil or an iris, and further improvement is required in order to accurately detect pupil information, which is necessary for eye gaze detection, such as a pupil or an iris.

CITATION LIST

Patent Literature

Patent Literature 1: JP 2005-296382 A

SUMMARY OF INVENTION

The present disclosure has been made to solve such a problem, and an object thereof is to further improve detection accuracy of pupil information.

An aspect of the present disclosure is an image processing method of detecting pupil information by an image processing device, the image processing method including: acquiring image data; detecting a face region including at least a part of a face of a person from the image data; setting a first region used for detection of an eye of the person in the face region having been detected; setting a second region estimated to include a pupil or an iris by narrowing the first region based on a predetermined criterion; detecting pupil information indicating the pupil or the iris in the second region; and outputting the pupil information having been detected.

DESCRIPTION OF EMBODIMENTS

Figure 1:
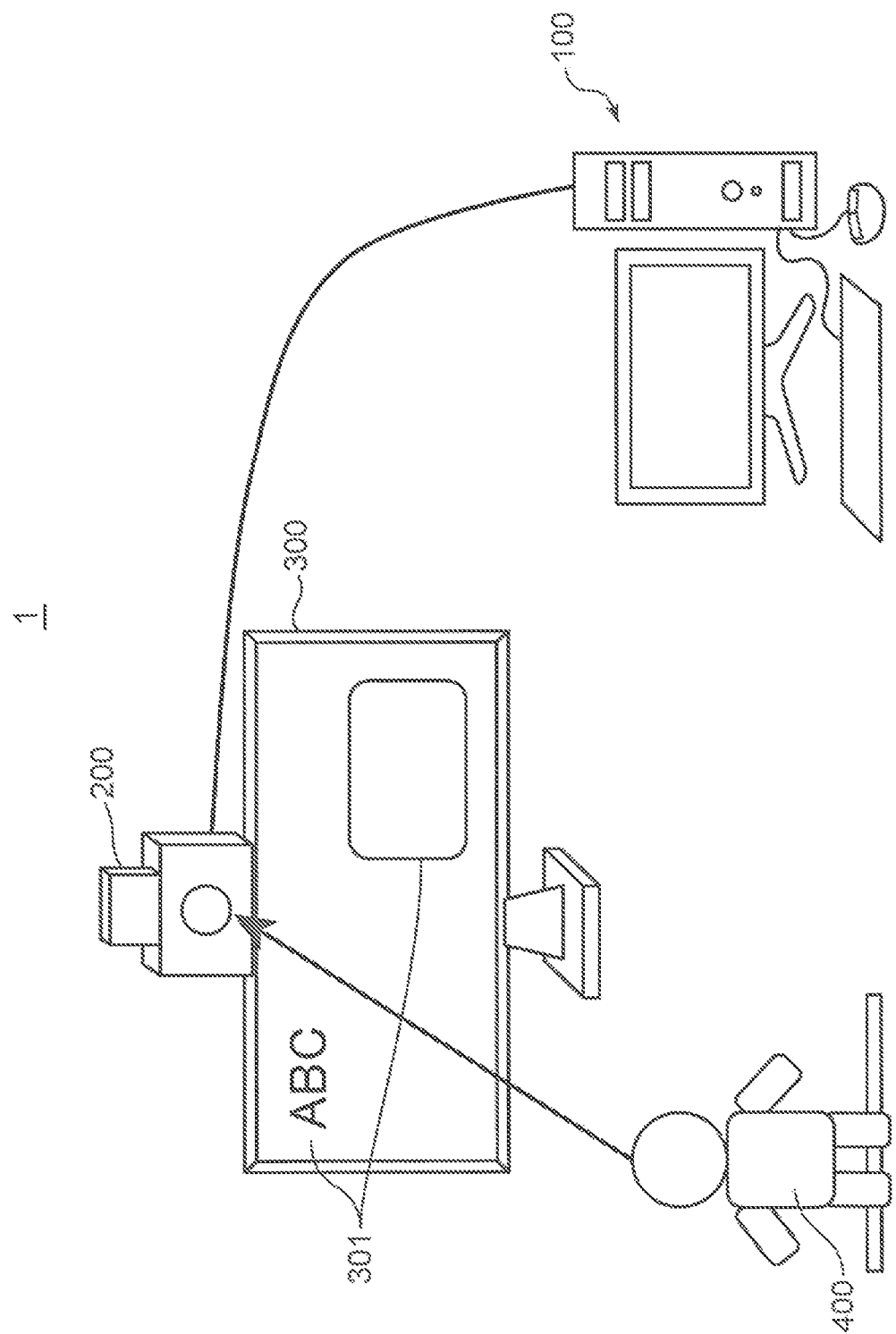
FIG. 1 is a view showing an example of an overall configuration of an image processing system according to a first embodiment of the present disclosure.

Embodiments of the present invention will be described below with reference to the accompanying drawings. Note that the following embodiments are examples embodying the present invention and are not intended to limit the technical scope of the present invention.

(Findings Underlying Present Disclosure)

In a method of detecting an eye gaze by a three-dimensional eyeball model, the eye gaze is detected based on a center position of the pupil or the iris. The center position of the pupil or the iris is obtained, for example, by detecting a face region including a face of a person from image data of an image including the face, setting an eye detection region for detecting the eye from the detected face region, and analyzing the eye detection region. Here, the eye detection region is not a region obtained by clipping the eye itself, but is, for example, a rectangular region including the eye, In a case where the eye detection region is set from the face region, a classifier created in advance is used for detecting the eye detection region, for example. In a case where the eye detection region is detected using such a classifier, a difference sometimes occurs in the size of the eye detection region detected according to the performance of the classifier, and hence, there is a possibility that a feature amount necessary for detecting the pupil or the iris is missing in the detected eye detection region. Therefore, the eye detection region needs to be set to a size with a certain margin compared to the size of the eye.

However, the present inventor has found a problem that in a case where the eye detection region is set large, an object similar to the pupil or the iris existing around the eye, such as a frame of glasses, is included in the eye detection region, and the possibility that the similar object is erroneously detected as the pupil or the iris increases, thereby ending up failing to accurately detect the pupil or the iris.

Therefore, as a result of conducting detailed studies on such a problem, the present inventor has obtained a finding that, not by executing processing for detecting the pupil or the iris as it is on the eye detection region but by narrowing the eye detection region based on a predetermined criterion and executing processing for detecting the pupil or the iris on the narrowed region, it is possible to improve the detection accuracy of the pupil or the iris, and eventually, to improve the accuracy of eye gaze detection, and the present inventor has conceived of the following aspects, An image processing method according to an aspect of the present disclosure is an image processing method of detecting pupil information by an image processing device, the image processing method including: acquiring image data; detecting a face region including at least a part of a face of a person from the image data; setting a first region used for detection of an eye of the person in the face region having been detected; setting a second region estimated to include a pupil or an iris by narrowing the first region based on a predetermined criterion; detecting pupil information indicating the pupil or the iris in the second region; and outputting the pupil information having been detected.

According to the present configuration, a second region estimated to include the pupil or the iris is set by narrowing the first region based on a predetermined criterion, and pupil information indicating the pupil or the iris is detected in the second region. Thus, even if information that is highly likely to be erroneously detected as a pupil or an iris, such as a frame of glasses, is included in the first region, a region in which such information is omitted from the first region is more likely to be set as the second region, and hence the present configuration is capable of improving the detection accuracy of the pupil or the iris. As a result, the present configuration can accurately specify the center position of the pupil or the iris, and can eventually improve the eye gaze detection accuracy.

Furthermore, according to the present configuration, since the pupil information detection processing is performed on the region narrowed from the eye detection region with the predetermined criterion, it is possible to achieve reduction of the processing load as compared with a case where the pupil information detection processing is performed on the entire eye detection region.

In the above aspect, the predetermined criterion may be a criterion for removing, in the first region, a predetermined amount of area from a boundary side of the first region.

According to the present configuration, the second region is set by removing a predetermined amount of area from the boundary side of the first region. Therefore, even if not executing high-load processing such as image recognition processing, the present configuration is capable of setting, as the second region, a region obtained by omitting, from the first region, information that is highly likely to be erroneously detected as a pupil or an iris, such as a frame of glasses.

In the above aspect, the predetermined criterion may be a criterion in which a region having a predetermined shape including the center of the first region is set as the second region by removing a part of the first region.

According to the present configuration, a region having a predetermined shape including the center of the first region is set as the second region. Therefore, the present configuration is capable of setting the second region such that unnecessary information is omitted while leaving information necessary for detecting the pupil information.

In the above aspect, the method may further include detecting an outer corner of the eye and an inner corner of the eye from the face region having been detected. When the outer corner of the eye and the inner corner of the eye have been detected, the predetermined criterion may set a region surrounding the outer corner of the eye and the inner corner of the eye as the second region by removing a part of the first region.

According to the present configuration, a region surrounding the outer corner of the eye and the inner corner of the eye obtained by removing a part of the first region is set as the second region. Thus, since the second region includes at least the inner corner and the outer corner of the eye, the present configuration is capable of setting the second region such that necessary information remains while omitting unnecessary information as much as possible in detecting pupil information.

In the above aspect, the method may further include detecting an outer corner of the eye and an inner corner of the eye from the face region having been detected. When the outer corner of the eye and the inner corner of the eye have been detected, a region that surrounds the outer corner of the eye and the inner corner of the eye and is smaller than the first region set in a case of having failed to detect the outer corner of the eye and the inner corner of the eye may be set as the first region in setting of the first region, and the pupil information may be detected in the first region in detection of the pupil information.

According to the present configuration, when the outer corner of the eye and the inner corner of the eye have been detected from the face region, processing for detecting pupil information is executed on the first region. Therefore, the present configuration is capable of executing processing for detecting pupil information on the first region without setting the second region. The first region is a region that surrounds the outer corner of the eye and the inner corner of the eye, and is smaller than the first region set in a case of having failed to detect the outer corner of the eye and the inner corner of the eye. Thus, since the first region includes at least the inner corner and the outer corner of the eye, the present configuration is capable of setting the first region such that, necessary information remains while omitting unnecessary information as much as possible in detecting pupil information.

In the above aspect, the method may further include detecting a facial feature point from the face region having been detected, detecting face orientation information indicating an orientation of the face of the person based on the facial feature point, detecting eye gaze information indicating an eye gaze of the person based on the pupil information and the face orientation information having been detected, and outputting the eye gaze information having been detected.

According to the present configuration, since the eye gaze information of the person is detected based on the pupil information detected through the above-described processing and the face orientation information detected from the facial feature point, the eye gaze information can be detected with high accuracy.

In the above aspect, the method may further include detecting at least one of an eyebrow and a corner of the mouth from the face region having been detected, and estimating a degree of interest of the person based on the eye gaze information and at least one of a position of the eyebrow having been detected and a position of the corner of the mouth having been detected.

According to the present configuration, the degree of interest can be estimated with higher accuracy as compared with the case where the degree of interest is estimated based only on the eye gaze information.

In the above aspect, the method may further include estimating an expression of the person based on at least one of a position of the eyebrow having been detected and a position of the corner of the mouth having been detected, and estimating a degree of interest of the person based on the eye gaze information and information indicating the estimated expression.

According to the present configuration, since the degree of interest is estimated using the information indicating the expression of the person estimated based on at least one of the position of the eyebrow and the position of the corner of the mouth and the eye gaze information, the degree of interest of the person can be estimated with higher accuracy.

In the above aspect, the eye gaze information may include information indicating an eye gaze plane that is a region of a predetermined range with respect to an eye gaze point of the person on a predetermined target plane.

According to the present configuration, it is possible to appropriately determine the eye gaze target object without depending on the distance between the person and the eye gaze target object or the size of the eye gaze target object.

In the above aspect, the image data may be captured by a visible light camera, and the pupil information may include information indicating a center position of the iris and a size of the iris.

In the image data captured by the visible light camera, there is a tendency that luminance change of the outer edge of the pupil does not appear clearly and luminance change of the outer edge of the iris appears clearly. In the present configuration, since the image data is captured by the visible light camera, the outer edge of the iris can be accurately detected, whereby the information indicating the size of the iris and the information indicating the center position of the iris can be accurately detected as the pupil information.

In the above aspect, the image data may be captured by an infrared light camera, and the pupil information may include at least one of information indicating a center position of the pupil and a size of the pupil and information indicating a center position of the iris and a size of the iris.

In the image data captured by the infrared light camera, luminance change of the outer edge of each of the pupil and the iris tends to appear clearly. In the present configuration, since the image data is captured by the infrared light camera, the outer edge of each of the pupil and the iris can be accurately detected, whereby the information indicating the size of each of the pupil and the iris and the information indicating the center position of each of the pupil and the iris can be accurately detected as the pupil information.

In the above aspect, the image data may be image data captured by an infrared light camera using infrared light in a predetermined second wavelength band in which a spectral intensity of sunlight is attenuated more than a predetermined first wavelength.

According to the present configuration, eye gaze detection can be performed accurately even outdoors where the spectral intensity of sunlight is strong.

In the above aspect, the method may further include detecting face orientation information indicating an orientation of a face of the person from the face region. In setting of the second region, as a rightward orientation degree of the face indicated by the face orientation information becomes greater, an exclusion width from a right boundary in the first region may be made narrower and an exclusion width from a left boundary in the first region may be made wider, and as a leftward orientation degree of the face indicated by the face orientation information becomes greater, an exclusion width from a left boundary in the first region may be made narrower and an exclusion width from a right boundary in the first region may be made wider.

According to the present configuration, an object such as a frame of glasses, for example, can be accurately removed from the first region, and the second region can be set so that information necessary for detecting pupil information is not missing.

The present disclosure can also be implemented as an image processing program for causing a computer to execute each characteristic configuration included in such an image processing method, or an image processing system operated by this image processing program. Furthermore, it goes without saying that such a computer program can be distributed via a computer-readable non-transitory recording medium such as a CD-ROM or a communication network such as the Internet.

Note that each of the embodiments described below shows a specific example of the present disclosure. Numerical values, shapes, constituent elements, steps, orders of steps, and the like shown in the following embodiments are merely examples, and are not intended to limit the present disclosure. Among the constituent elements in the following embodiments, constituent elements that are not described in independent claims indicating the highest concept are described as discretionary constituent elements. In addition, in all the embodiments, each of the contents can be combined.

First Embodiment

FIG. 1 is a view showing an example of an overall configuration of an image processing system 1 according to the first embodiment of the present disclosure. The image processing system 1 is a system that captures a person 400 and detects eye gaze information indicating an eye gaze of the person from the obtained image data of the person. In the example of FIG. 1, the image processing system 1 specifies which object 301 the person gazes at among a plurality of objects 301 displayed on a display device 300. However, this is an example, and the image processing system 1 may specify not only the object 301 displayed on the display screen of the display device 300 but also the object 301 gazed by the person 400 in the real space.

In the example of FIG. 1, the image processing system. I is applied to a digital signage system. Therefore, the object 301 displayed on the display device 300 is an image of signage such as an advertisement.

The image processing system I includes an image processing device 100, a camera 200, and the display device 300. The image processing device 100 is connected to the camera 200 and the display device 300 via a predetermined communication path. The predetermined communication path is, for example, a wired communication path such as a wired LAN, or a wireless communication path such as a wireless LAN and Bluetooth (registered trademark). The image processing device 100 includes, for example, a computer installed around the display device 300. However, this is an example, and the image processing device 100 may include a cloud server. In this case, the image processing device 100 is connected to the camera 200 and the display device 300 via the Internet. The image processing device 100 detects eye gaze information of the person 400 from the image data of the person 400 captured by the camera 200, and outputs the eye gaze information to the display device 300. Furthermore, the image processing device 100 may be incorporated as hardware in the camera 200 or the display device 300. Furthermore, the camera 200 or the display device 300 may include a processor, and the image processing device 100 may be incorporated as software.

By capturing an image of an environment around the display device 300 at a predetermined frame rate, for example, the camera 200 acquires image data of the person 400 positioned around the display device 300. The camera 200 sequentially outputs the acquired image data to the image processing device 100 at a predetermined frame rate. The camera 200 may be a visible light camera or may be an infrared light camera.

The display device 300 includes a display device such as a liquid crystal panel or an organic EL panel. In the example of FIG. 1, the display device 300 is a signage display, Note that in the example of FIG. 1, the image processing system I is described to include the display device 300, but this is an example, and another piece of equipment may be adopted instead of the display device 300. For example, if the image processing system 1 is used as a user interface that receives an input to equipment by an eye gaze, the image processing system 1 may adopt home appliances such as a refrigerator, a television set, and a washing machine instead of the display device 300, for example. For example, if the image processing system 1 is mounted on a vehicle, a vehicle such as an automobile may be adopted instead of the display device 300. Furthermore, a storage device such as a hard disk drive or a solid state drive may be adopted instead of the display device 300.

Figure 2:
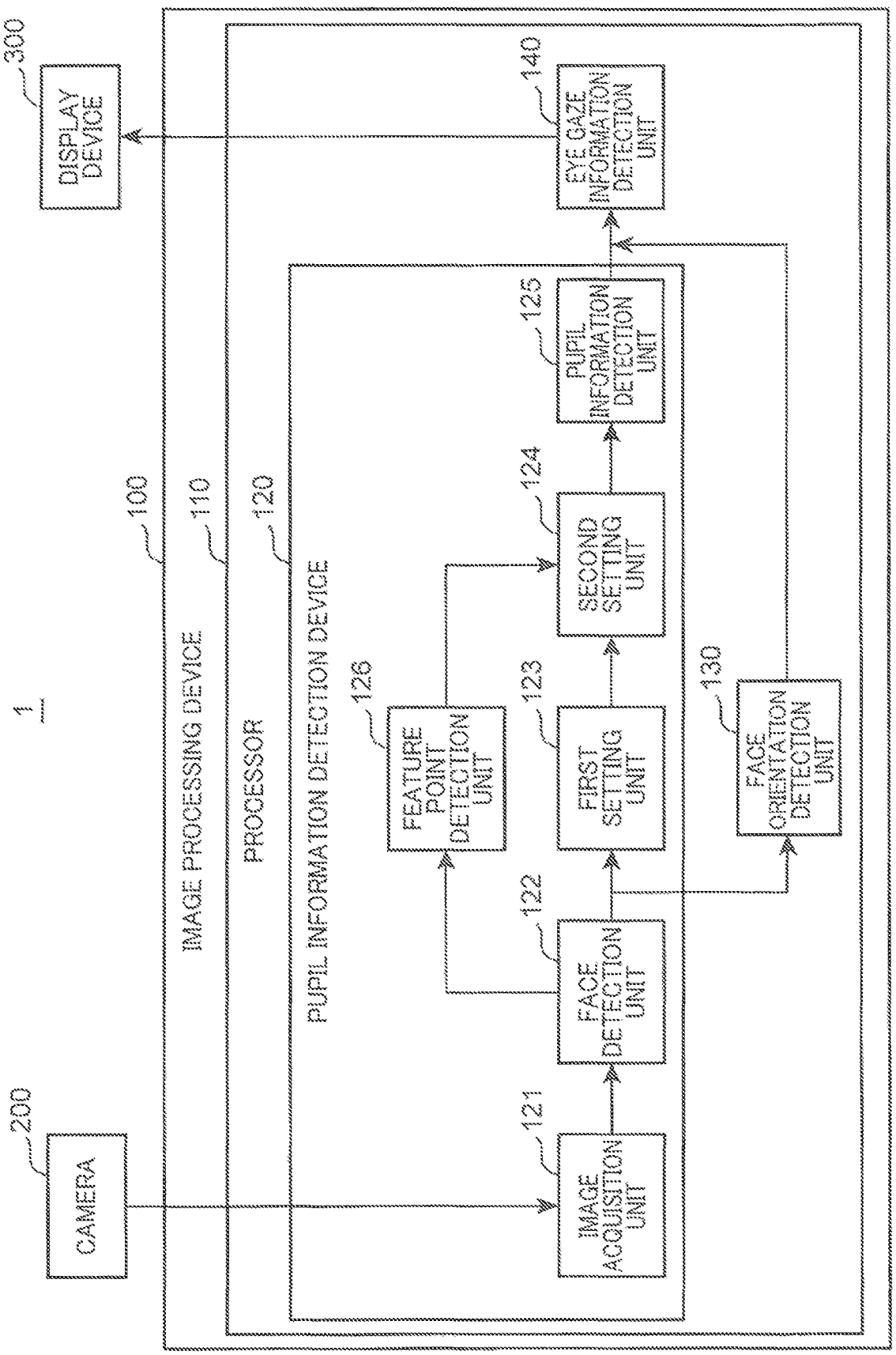
FIG. 2 is a block diagram showing an example of a detailed configuration of the image processing system according to the first embodiment.

FIG. 2 is a block diagram showing an example of a detailed configuration of the image processing system 1 according to the first embodiment. The image processing device 100 includes a processor 110. The processor 110 is an electric circuit such as a CPU or an FPGA. The processor 110 includes a pupil information detection device 120, a face orientation detection unit 130, and an eye gaze information detection unit 140.

The pupil information detection device 120 includes an image acquisition unit 121 (an example of the acquisition unit), a face detection unit 122, a first setting unit 123, a second setting unit 124, a pupil information detection unit 125, and a feature point detection unit 126. Note that each block included in the processor 110 may be implemented by the processor 110 executing an image processing program for causing a computer to function as an image processing device, or may be configured by a dedicated electric circuit.

The image acquisition unit 121 acquires image data captured by the camera 200. Here, the acquired image data includes the face of the person 400 around the display device 300. Note that the image data acquired by the image acquisition unit 121 may be, for example, image data posted on a website or may be image data stored in an external storage device.

The face detection unit 122 detects a face region including at least a part of the face of the person 400 from the image data acquired by the image acquisition unit 121. Specifically, the face detection unit 122 is only required to detect the face region using a classifier created in advance for detecting the face region. The classifier used here is a Haar-like cascade classifier created in advance for detecting the face region in an open-source image processing library, for example. The face region is a rectangular region having a size enough to include the entire face, for example. However, this is an example, and the shape of the face region may be, for example, a triangle, a pentagon, a hexagon, an octagon, or the like other than a rectangle. Note that the face detection unit 122 may detect the face region by pattern matching.

Figure 5:
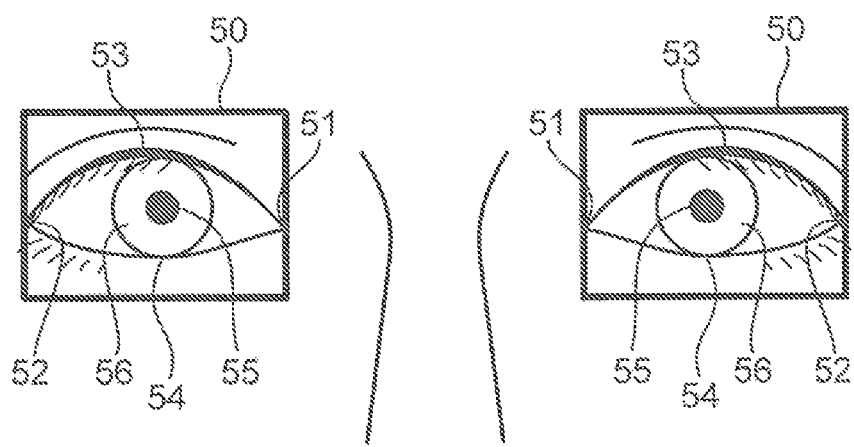
FIG. 5 is a view showing a first region.

The first setting unit 123 sets a first region used for detection of the eyes of the person 400 in the face region detected by the face detection unit 122. Methods by which the first setting unit 123 sets the first region include, for example, a method using a classifier created in advance for detecting the eye detection region. The classifier used here is a Haar-like cascade classifier created in advance for detecting the eye detection region in an open-source image processing library, for example. The first region (eye detection region) is a rectangular region having a size in which a predetermined margin is added to the size of the eye. However, this is an example, and the shape of the first region may be, for example, a triangle, a pentagon, a hexagon, an octagon, or the like other than a rectangle. When the two eyes of the person 400 are included in the face region, the first setting unit 123 sets two first regions corresponding respectively to the two eyes. Note that the first setting unit 123 may set the first region by pattern matching. In the present embodiment, the eye refers to a region including the white of the eye and a colored part such as the iris that are surrounded by a boundary 53 of the upper eyelid and a boundary 54 of the lower eyelid as shown in FIG. 5.

The second setting unit 124 sets the second region estimated to include the pupil or the iris by narrowing, based on a predetermined criterion, the first region set by the first setting unit 123. The second region is, for example, a rectangular region smaller than the first region. However, this is an example, and the shape of the second region may be, for example, a triangle, a pentagon, a hexagon, an octagon, or the like other than a rectangle.

In the present embodiment, any one of the following three criteria is adopted as the predetermined criterion. It goes without saying that the predetermined criteria are not limited to the following three examples.

The first criterion is a criterion for removing, in the first region, a predetermined amount of area from a boundary side of the first region. The second criterion is a criterion in which a region having a predetermined shape including the center of the first region is set as the second region by removing a part of the first region. The third criterion is a criterion in which a region surrounding the outer corner of the eye and the inner corner of the eye is set as the second region by removing a part of the first region. Note that the third criterion is applied when the outer corner of the eye and the inner corner of the eye have been detected from the face region. In a case of having failed to detect the outer corner of the eye and the inner corner of the eye from the face region, the second setting unit 124 may set the second region using the first criterion or the second criterion instead of the third criterion.

The second setting unit 124 may detect the outer corner of the eye and the inner corner of the eye based on the facial feature point detected by the feature point detection unit 126. Specifically, when there is a feature point having a predetermined landmark point number corresponding to each of the outer corner of the eye and the inner corner of the eye at the facial feature point detected by the feature point detection unit 126, the second setting unit 124 is only required to determine that the outer corner of the eye and the inner corner of the eye have been detected. A specific example of the detection processing of the outer corner of the eye and the inner corner of the eye will be described later.

The pupil information detection unit 125 detects pupil information indicating the pupil or the iris in the second region set by the second setting unit 124.

In the present embodiment, as shown in FIG. 5, the pupil refers to a colored part including a pupil 55 and a donut-like iris 56 surrounding the pupil 55.

When the pupil information detection unit 125 detects the pupil, the pupil information includes, for example, coordinate data indicating an outer edge of the pupil or information indicating a length (e.g., a pixel) such as a radius or a diameter of the outer edge of the pupil, and coordinate data of the center of the pupil. When the pupil information detection unit 125 detects the iris, the pupil information includes, for example, coordinate data indicating an outer edge of the iris or information indicating a length (e.g., a pixel) such as a radius or a diameter of the iris, and coordinate data of the center of the iris. Here, the coordinate data refers to two-dimensional coordinate data in the image data acquired by the image acquisition unit 121. Note that the coordinate data indicating the outer edge of the pupil or the outer edge of the iris or the information indicating the length such as the radius or the diameter is an example of the information indicating the size of the pupil or the size of the iris.

If a visible light camera is adopted as the camera 200, there is a case where a luminance change between the pupil and the iris does not appear clearly, and hence, it is difficult for the pupil information detection unit 125 to distinguish between the pupil and the iris. Therefore, if a visible light camera is adopted as the camera 200, the pupil information detection unit 125 detects the iris. On the other hand, if an infrared light camera is adopted as the camera 200, the luminance changes between the pupil and the iris appears clearly, and hence the pupil information detection unit 125 can detect the pupil. Therefore, if an infrared light camera is adopted as the camera 200, the pupil information detection unit 125 detects the pupil.

Note that, if an infrared light camera is adopted as the camera 200, the pupil information detection unit 125 can also detect the iris. Therefore, if an infrared light camera is adopted as the camera 200, the pupil information detection unit 125 may detect the iris in addition to the pupil. In this case, the pupil information may include coordinate data indicating the outer edge of the iris or information indicating the radius or diameter of the outer edge of the iris, in addition to coordinate data indicating the outer edge of the pupil and coordinate data of the center of the pupil or information indicating the radius or diameter of the outer edge of the pupil. Furthermore, in this case, the pupil information may include, for example, coordinate data of the center of the iris instead of or in addition to the coordinate data of the center of the pupil. Here, the coordinate data refers to two-dimensional coordinate data in the image data acquired by the image acquisition unit 121.

The feature point detection unit 126 detects a facial feature point from the face region detected by the face detection unit 122. The facial feature point is one or a plurality of points at characteristic positions in each of a plurality of parts constituting the face such as the outer corner of the eye, the inner corner of the eye, the contour of the face, the ridge of the nose, the corner of the mouth, and the eyebrow, for example. The feature point is also called a landmark. The feature point detection unit 126 is only required to detect a facial feature point by executing landmark detection processing using a model file of a framework of machine learning, for example.

The face orientation detection unit 130 detects a facial feature point from the face region detected by the face detection unit 122, and detects face orientation information indicating the orientation of the face of the person 400 from the arrangement pattern of the detected feature point. The face orientation detection unit 130 may detect the face orientation information using the facial feature point detected by the feature point detection unit 126. A specific example of the detection processing of the face orientation information will be described later.

Based on the pupil information detected by the pupil information detection unit 125 and the face orientation information detected by the face orientation detection unit 130, the eye gaze information detection unit 140 detects the eye gaze information indicating the eye gaze of the person 400 and outputs the eye gaze information to the display device 300. The eye gaze information detection unit 140 is only required to detect the eye gaze information by applying known eye gaze detection processing for detecting an eye gaze by a three-dimensional eyeball model, for example, to the pupil information and the face orientation information. Here, the eye gaze information may include a vector three-dimensionally indicating the direction of the eye gaze of the person 400, or may include coordinate data of an eye gaze point on a predetermined target plane (e.g., the display device 300). The eye gaze point is, for example, a position at which the target plane and the vector indicating the eye gaze intersect.

The eye gaze information detection unit 140 may acquire information of the object 301 displayed on the display device 300, specify the object 301 (gaze object) at which the person 400 gazes from the acquired information and the coordinate data of the eye gaze point, and output the specification result to the display device 300.

For example, in a case where coordinate data of the eye gaze point is output to the display device 300 as eye gaze information, the display device 300 performs processing of displaying, at a position corresponding to the coordinate data, a marker indicating the eye gaze position superimposed on the screen being displayed. For example, when the specification result of the eye gaze object is output to the display device 300, the display device 300 may perform processing of displaying a marker indicating the eye gaze object superimposed on the screen being displayed.

Since the camera 200 has been described with reference to FIG. 1, the description thereof is omitted here.

The display device 300 displays a marker indicating the eye gaze information output from the eye gaze information detection unit 140, for example. The display device 300 may display a marker indicating the object 301 gazed by the person 400 output from the eye gaze information detection unit 140, for example.

Note that, in a case where the image processing system 1 includes a home appliance instead of the display device 300, the home appliance receives an input of the person 400 from the eye gaze information. Furthermore, in a case where the image processing system 1 includes a storage device instead of the display device 300, the storage device stores the eye gaze information. In this case, the storage device may store the eye gaze information in association with a time stamp.

Figure 3:
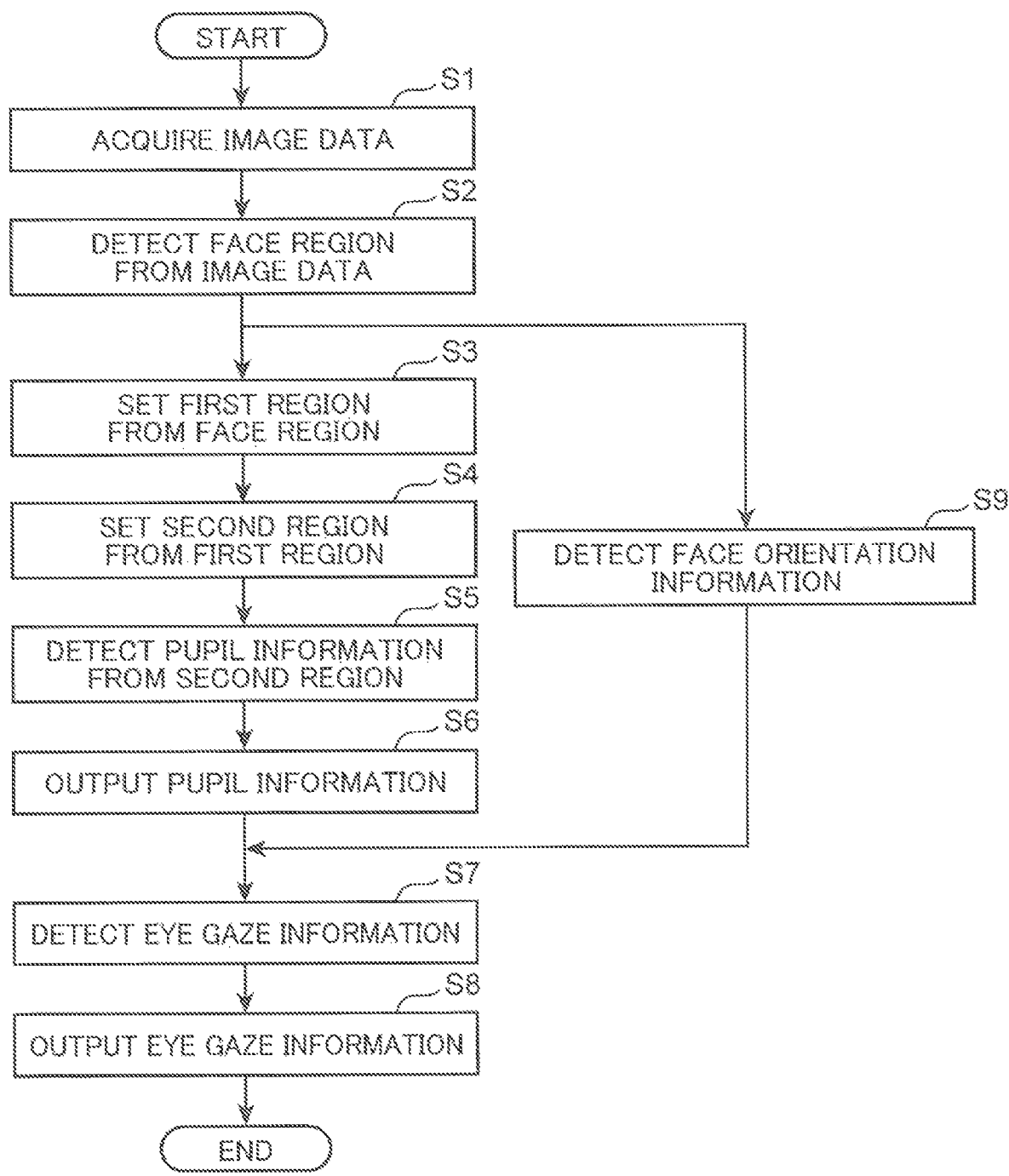
FIG. 3 is a flowchart showing an example of an operation of an image processing device according to the first embodiment.

Next, the operation of the image processing device 100 will be described, FIG. 3 is a flowchart showing an example of the operation of the image processing device 100 according to the first embodiment.

Figure 4:
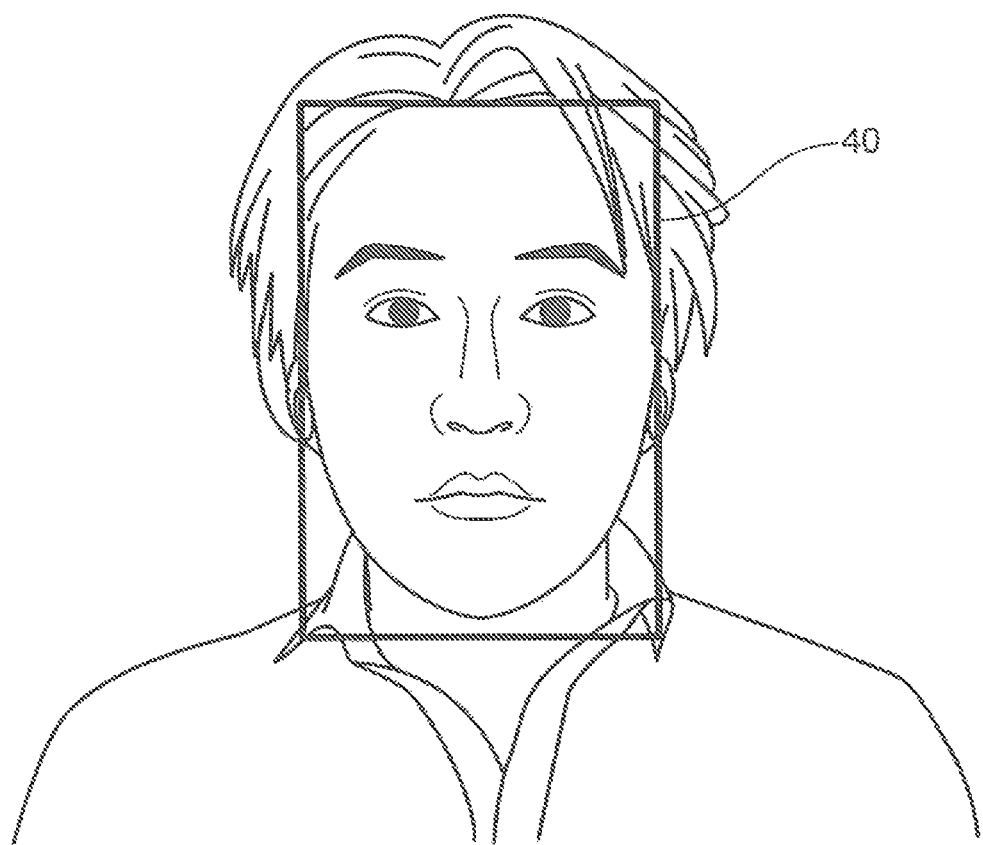
FIG. 4 is a view showing a face region.

In step S1, the image acquisition unit 121 acquires image data from the camera 200. In step S2, the face detection unit 122 detects a face region from the image data by inputting the image data to a classifier for detecting the face region. FIG. 4 is a view showing a face region 40. As shown in FIG. 4, the face detection unit 122 detects, as the face region 40, a rectangular region including an upper part of the forehead, a lower part of the chin, and the hairline of the cars. Here, the face region 40 does not include the entire hair, but may be a region including the entire hair. In FIG. 4, since the image data includes the person 400 captured from the front, it includes the left eye and the right eye. In the present embodiment, for convenience of description, the right eye refers to the eye on the right side when the person 400 is viewed from the front, and the left eye refers to the eye on the left side when the person 400 is viewed from the front. However, this is an example, and the eye on the right side as viewed from the person 400 may be the right eye and the eye on the left side as viewed from the person 400 may be the left eye. In the present embodiment, the direction on the right side of the paper surface is defined as the right side, and the direction on the left side of the paper surface is defined as the left side.

Returning to FIG. 3. In step S3, the first setting unit 123 inputs the face region detected in step S2 to the classifier for detecting the first region, and sets the first region. FIG. 5 is a view showing a first region 50. FIG. 5 indicates that the first region 50 is a rectangular region including the entire area of the eye and having some margin added to the size of the eye. Note that the position at which the boundary of the first region 50 is set with respect to the eye depends on the performance of the classifier. Therefore, the size of the first region 50 varies depending on the performance of the classifier. For example, the upper boundary of the first region SO may extend to the vicinity of the eyebrow of the upper eyelid. In addition, the boundary on the nose side of the first region 50 can extend to the vicinity of the nose, and the boundary on the ear side of the first region 50 may extend to the vicinity of the temple.

In the example of FIG. 5, since the face region 40 includes the right and left eyes, the first setting unit 123 sets two first regions 50 corresponding respectively to the right eye and the left eye.

Figure 11:
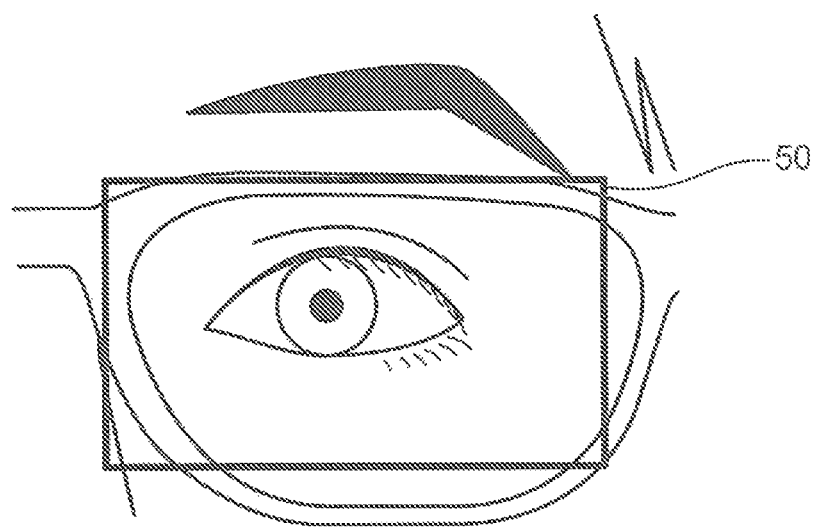
FIG. 11 is a view showing another example of the first region.

Refer back to FIG. 3. In step S4, the second setting unit 124 sets the second region from the first region 50 by narrowing the first region 50 using any of the first criterion to the third criterion described above. In a case where the first region 50 is set to a size larger than the size of the eye, if the person 400 wears glasses, there is a possibility that the glasses are included in the first region 50. FIG. 11 is a view showing another example of the first region 50. The example of FIG. 11 indicates that the person 400 wears glasses, and the boundary of the first region 50 extends to the glasses. In such a case, there is a possibility that the frame of the glasses is erroneously detected as the pupil information, and the detection accuracy of the pupil information is lowered.

Figure 6:
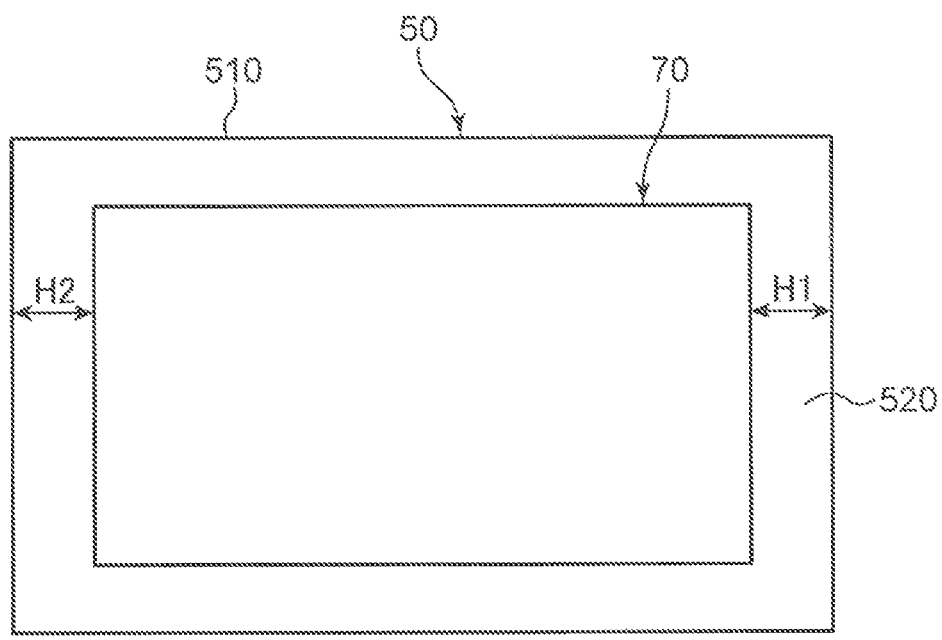
FIG. 6 is a view showing a second region set based on a first criterion.

Therefore, in the present embodiment, the second region is set by narrowing the first region 50. FIG. 6 is a view showing a second region 70 set based on the first criterion. As shown in FIG. 6, the second region 70 is set by removing, from the first region 50, a predetermined amount of area of the first region 50 from a boundary 510 side of the first region 50. As the predetermined amount of area, an appropriate value such as 5%, 10%, or 20% of the area of the first region SO can be adopted. As the predetermined amount of area, a value determined in advance according to the tendency of the size of the first region 50 set by the first setting unit 123 is adopted. For example, if the size of the first region 50 set by the first setting unit 123 shows a tendency of becoming large with respect to the eye, a large value is adopted for the predetermined amount of area according to the tendency.

In the example of FIG. 6, the second setting unit 124 sets a rectangular frame region 520 that is in contact with four sides of the boundary 510 and has a predetermined amount of area so that the second region 70 maintains a similar shape to the first region 50, and sets the second region 70 by removing the frame region 520 from the first region 50. Thus, the second region 70 is set such that the first region 50 is narrowed from the four sides of the boundary 510 toward the center of the first region 50. Therefore, the second setting unit 124 can omit, from the second region 70, a frame of glasses that tends to appear along the boundary 510 of the first region 50, for example.

Depending on whether the face of the person 400 is oriented rightward or oriented leftward, the position at which the frame of the glasses appears in the first region 50 is sometimes different. For example, when the face is oriented rightward, the frame of the glasses appearing on the left side of the boundary 510 of the first region 50 tends to appear wider in width than the frame of the glasses appearing on the right side of the boundary 510. On the other hand, when the face is oriented leftward, the frame of the glasses appearing on the right side of the boundary 510 of the first region 50 tends to appear wider in width than the frame of the glasses appearing on the left side of the boundary 510.

Therefore, the second setting unit 124 may change the shape of the frame region 520 according to the face orientation indicated by the face orientation information detected by the face orientation detection unit 130. Specifically, in a case where the face orientation is rightward, the second setting unit 124 may set a width H1 of the right side portion of the frame region 520 to be narrower than the width H1 in a case where the face orientation is not considered, and may set a width H2 of the left side portion of the frame region 520 to be wider than the width H2 in a case where the face orientation is not considered. In this case, the second setting unit 124 may set the width H1 to be narrower and the width H2 to be wider as the rightward orientation degree of the face indicated by the face orientation information increases.

A calculation method of the rightward orientation degree of the face will be described later.

On the other hand, in a case where the face orientation is leftward, the second setting unit 124 may set the width H2 of the left side portion of the frame region 520 to be narrower than the width H2 in a case where the face orientation is not considered, and may set the width H1 of the right side portion of the frame region 520 to be wider than the width H1 in a case where the face orientation is not considered. In this case, the second setting unit 124 may set the width H2 to be narrower and the width H1 to be wider as the leftward orientation degree of the face indicated by the face orientation information increases. A calculation method of the leftward orientation degree of the face will be described later.

Thus, by changing the widths H1 and H2 of the frame region $20 according to the orientation of the face, the second region 70 can be set so that the frame of the glasses is removed more accurately and the information necessary for detecting the pupil information is not missing.

Figure 7:
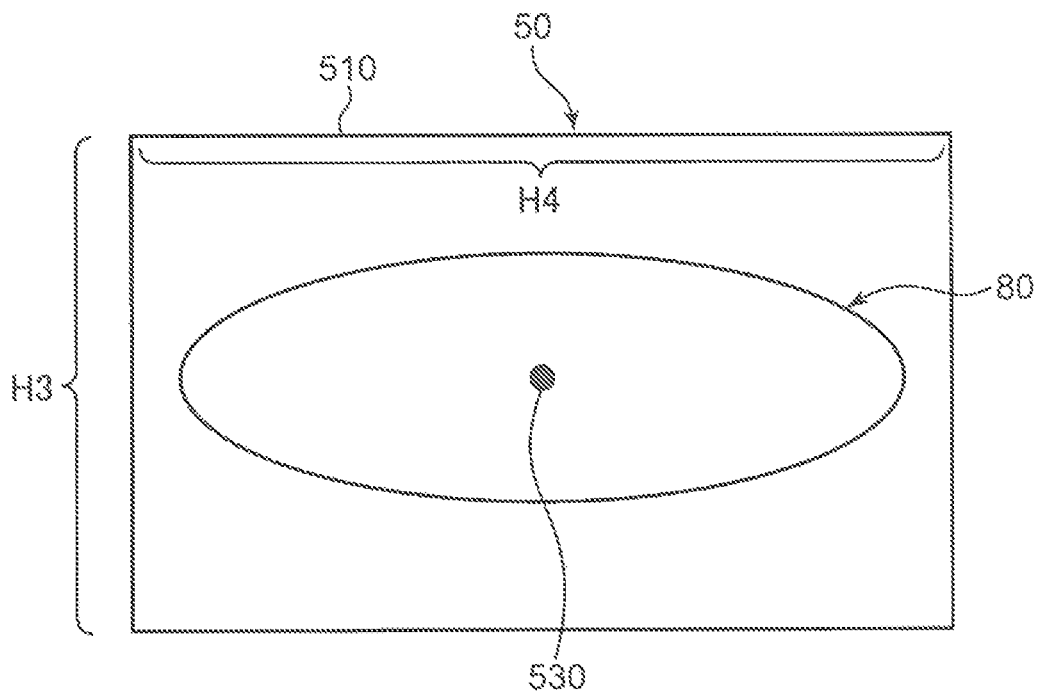
FIG. 7 is a view showing a second region set based on a second criterion.

Next, the second criterion will be described. FIG. 7 is a view showing a second region 80 set based on the second criterion. As shown in FIG. 7, the second region 80 includes a center $30 of the first region 50 and has a horizontally long circular shape (e.g., an elliptical shape) approximating the shape of the eye. For example, the second setting unit 124 sets the vertical width of the second region 80 by reducing a vertical side H3 of the boundary 510 of the first region 50 by a predetermined ratio $\alpha$ ($0<\alpha<1$), and sets the horizontal width of the second region 80 by reducing a horizontal side H4 of the boundary 510 by a predetermined ratio $\beta$ ($0<\beta<1$). Then, the second setting unit 124 may set, as the second region 80, an ellipse having the set vertical width as the minor axis and the horizontal width as the major axis, in which the center of the ellipse is positioned at the center 530 of the first region 50 and the major axis is parallel to the horizontal side H4.

Alternatively, the second setting unit 124 may set, as the second region 80, a figure having an area smaller than the area of the first region 50 by a predetermined amount of area and having a horizontally long circular shape approximating a predetermined shape of the eye. As the predetermined amount of area, the one described based on the first criterion can be adopted. Also in this case, the second setting unit 124 may set the second region 80 such that the center of the figure having the horizontally long circular shape is positioned at the center 530. In the second criterion, since the second region 80 has a shape approximating the eye, the second region 80 can be set such that unnecessary information is omitted while information necessary for detecting pupil information remains.

Figure 8:
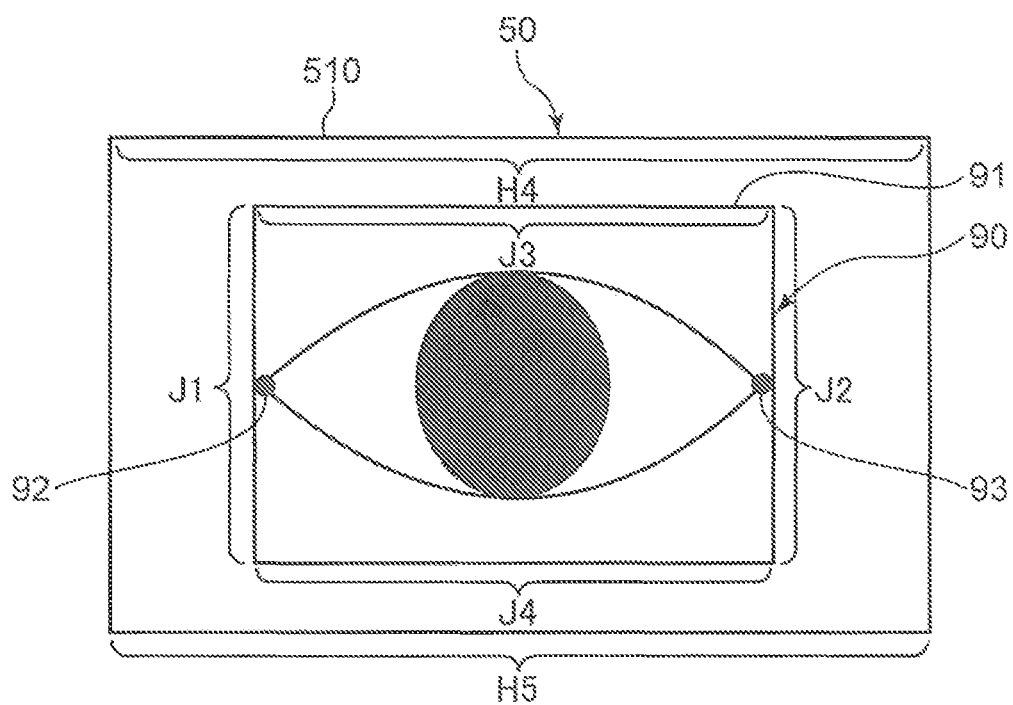
FIG. 8 is a view showing a second region set based on a third criterion.

Next, the third criterion will be described. FIG. 8 is a view showing a second region 90 set based on the third criterion. As shown in FIG. 8, the second region 90 is a region surrounding an inner corner 92 of the eye and an outer corner 93 of the eye, and is a region smaller in size than the first region 50. In the example of FIG. 8, the second region 90 is rectangular, but this is an example, and may be a triangle, a pentagon, or a polygon other than a rectangle. Alternatively, the second region 90 may be an oval such as an ellipse passing through the inner corner 92 of the eye and the outer corner 93 of the eye. In the example of FIG. 8, a vertical side J1 of the second region 90 on the inner corner 92 of the eye side passes through the inner corner 92 of the eye, and a vertical side J2 on the outer corner 93 of the eye side passes through the outer corner 93 of the eye. However, this is an example, and the vertical side J1 may be set slightly on the nose side with respect to the inner corner 92 of the eye, and the vertical side J2 may be set slightly on the ear side with respect to the outer corner 93 of the eye.

The second setting unit 124 is only required to set a horizontal side J3 on the upper side of the second region 90 to a position separated downward by a predetermined distance from the horizontal side H4 on the upper side of the first region 50, and to set a horizontal side J4 on the lower side of the second region 90 to a position separated upward by a predetermined distance from a horizontal side H5 on the lower side of the first region 50.

In the third criterion, since the second region 90 includes at least the inner corner 92 of the eye and the outer corner 93 of the eye, the second region 90 can be set such that necessary information remains while omitting unnecessary information as much as possible in detecting pupil information. Hereinafter, the second regions 70, 80, and 90 will be collectively referred to as a second region 60.

Figure 9:
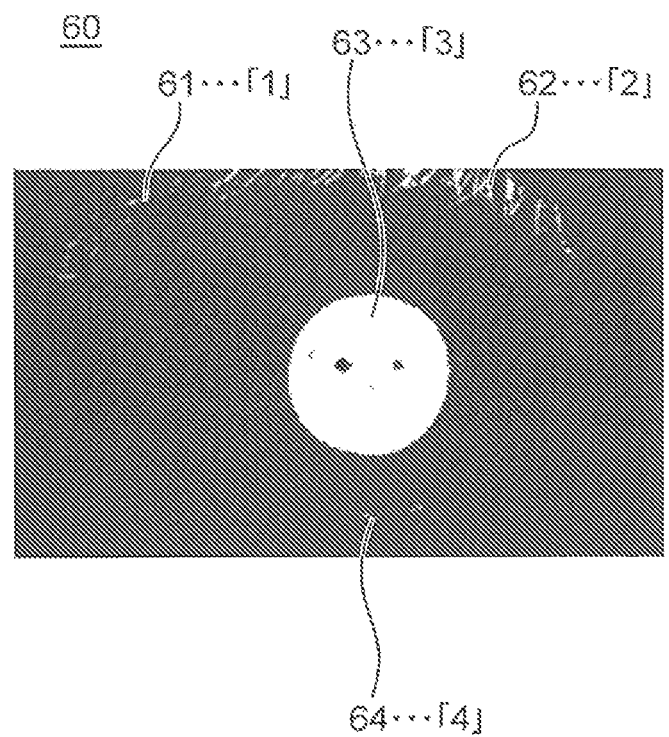
FIG. 9 is a view showing a binarized second region.

Refer back to FIG. 3. In step S5, the pupil information detection unit 125 detects pupil information from the second region 60. Details of processing for detecting pupil information will be described below. First, the pupil information detection unit 125 binarizes the second region 60. FIG. 9 is a view showing the second region 60 having been binarized. Here, for example, a method called Otsu's binarization is adopted. In addition, a portion where the luminance is lower than a threshold is represented by white, and a portion where the luminance is equal to or higher than the threshold is represented by black.

Next, the pupil information detection unit 125 performs labeling processing of imparting a labeling number to a white connected region appearing in the binarized second region 60. In the example of FIG. 9, the left side of the upper eyelashes is regarded as one connected region 61, and a labeling number of "1" is imparted to the connected region 61. The right side of the upper eyelashes is regarded as one connected region 62, and a labeling number of "2" is imparted to the connected region 62. The pupil is regarded as one connected region 63, and a labeling number of "3" is imparted to the connected region 63. The lower eyelashes are regarded as one connected region 64, and a labeling number of "4" is imparted to the connected region 64.

Next, the pupil information detection unit 125 determines whether or not a predetermined determination condition is satisfied for each of the labeled connected regions 61 to 64, and determines, as the pupil, the connected region satisfying the determination condition. As the determination condition, a condition of equal to or more than a predetermined pupil minimum area and equal to or less than a predetermined pupil maximum area can be adopted. The pupil minimum area is the minimum area of the pupil assumed in the image data, and the pupil maximum area is the maximum area of the pupil assumed in the image data. Note that, in a case where there is a plurality of connected regions satisfying the determination condition, the pupil information detection unit 125 may determine, as the pupil, the connected region having the largest area, for example. Here, the connected region 63 is determined as the pupil.

Next, the pupil information detection unit 125 detects the center of the pupil. Here, for example, the center of gravity of the connected region 63 of the pupil is detected as the center of the pupil.

The image shown in FIG. 9 is an image captured by an infrared light camera. In the image data captured by the infrared light camera, a large luminance change appears between the pupil and the iris. Therefore, in the example of FIG. 9, the connected region 63 of the pupil is detected by binarization. On the other hand, in the image data captured by a visible light camera, a large luminance change does not appear between the pupil and the iris, and a large luminance change appears at the boundary between the iris and the white of eye.

Therefore, for example, in a case where the camera 200 is an infrared light camera, the pupil information detection unit 125 detects the pupil from the binarized second region 60. On the other hand, for example, in a case where the camera 200 is a visible light camera, the pupil information detection unit 125 detects the iris from the binarized second region 60. In this case, the pupil information detection unit 125 is only required to adopt, as the determination condition, a condition of equal to or more than a predetermined iris minimum area and equal to or less than a predetermined iris minimum area. Note that the minimum iris area and the maximum iris area mentioned here do not refer to the area of the donut-like iris itself but refer to the maximum area and the minimum area of a region including the pupil in the iris, i.e., the pupil. In this case, the pupil information detection unit 125 is only required to detect the center of the iris. As the center of the iris, for example, the center of gravity of a connected region indicating the iris can be adopted.

Figure 10:
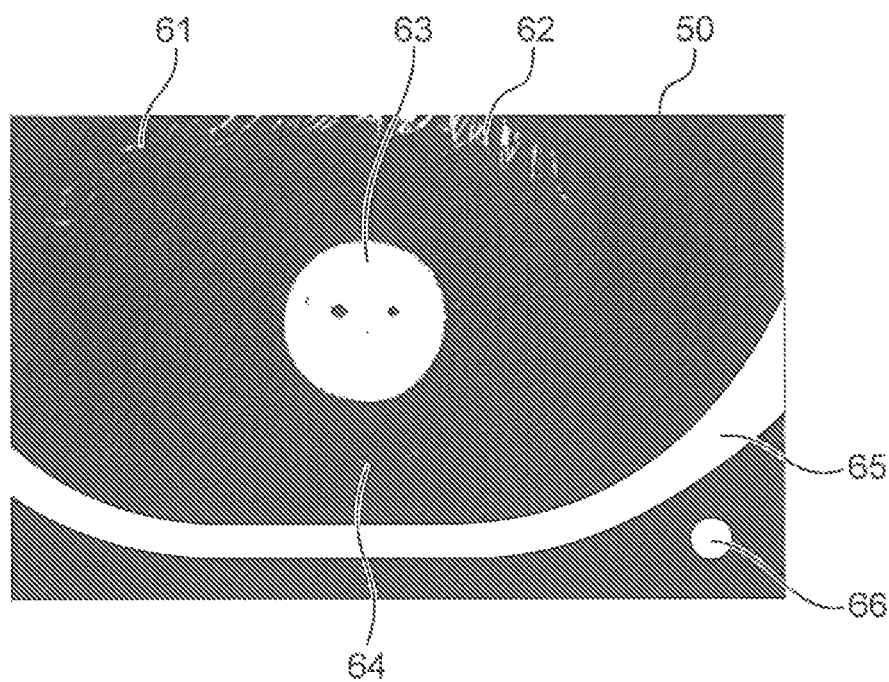
FIG. 10 is a view showing a comparative example of the present disclosure, and is a view showing a binarized first region.

FIG. 10 is a view showing a comparative example of the present disclosure, and is a view showing the first region SO having been binarized. As shown in FIG. 10, in a case where the person 400 wears glasses, if binarization processing is performed directly on the first region 50, there is a possibility that a connected region 65 indicating the frame of the glasses appears in the first region 50. Furthermore, depending on the person 400, there is a possibility that a connected region 66 showing a mole (or a bruise) appears in the first region 50. In such a case, depending on the size of the frame of the glasses or the size of the mole, there is a possibility that the connected region 65 of the frame of the glasses or the connected region 66 of the mole is erroneously detected as a pupil or an iris.

On the other hand, since the second region 60 is a region set by narrowing the first region 50, there is a high possibility as shown in FIG. 9 that the connected region 65 of the frame of the glasses and the connected region 66 of the mole are not included. Therefore, in the present embodiment, pupil information can be accurately detected.

Next, the pupil information detection unit 125 executes pupil outer edge detection processing for detecting the outer edge of the pupil. As the pupil outer edge detection processing, pupil outer edge detection processing using a part of the method proposed by John G. Daugman (hereinafter, referred to as a "Daugman algorithm") is only required to be adopted. Daugman algorithm is disclosed in the document "High Confidence Visual Recognition of Persons by a Test of Statistical Independence: John G. Daugman (1993)".

Specifically, in the pupil outer edge detection processing, the pupil information detection unit 125 first sets a circle having a predetermined pupil minimum radius with the center of the pupil detected from the binarized second region 60 as the center of the circle. The pupil information detection unit 125 next obtains a total value of the luminance on the circumference of the set circle by contour integral. The pupil information detection unit 125 next obtains the total value of the luminance by performing the contour integral on a circle in which the radius of the circle set immediately before is radially expanded by one pixel. The pupil information detection unit 125 next repeatedly executes this processing up to a predetermined pupil maximum radius. This gives a function indicating the relationship between the plurality of radii and the total value of the luminance corresponding to each of the plurality of radii. Next, the pupil information detection unit 125 partially differentiates this function with respect to the radius, obtains the maximum change amount of the total value of the luminance of the adjacent radii, and detects, as the pupil outer edge, the circle of the radius at the position where the maximum change amount is detected.

Note that, in a case where the image data is image data captured by the visible light camera, the pupil information detection unit 125 detects the iris outer edge by applying the pupil outer edge detection processing to the binarized second region 60. Therefore, in a case where the image data is image data captured by the visible light camera, the processing of detecting the pupil information shown in step S5 ends here. In this case, the pupil information includes the coordinate data of the iris outer edge and the coordinate data of the center of the iris.

On the other hand, in a case where the image data is image data captured by the infrared light camera, the iris outer edge detection processing of detecting the iris outer edge described below may be executed. As the iris outer edge detection processing, the iris outer edge detection processing using a part of Daugman algorithm can be adopted.

Figure 12:
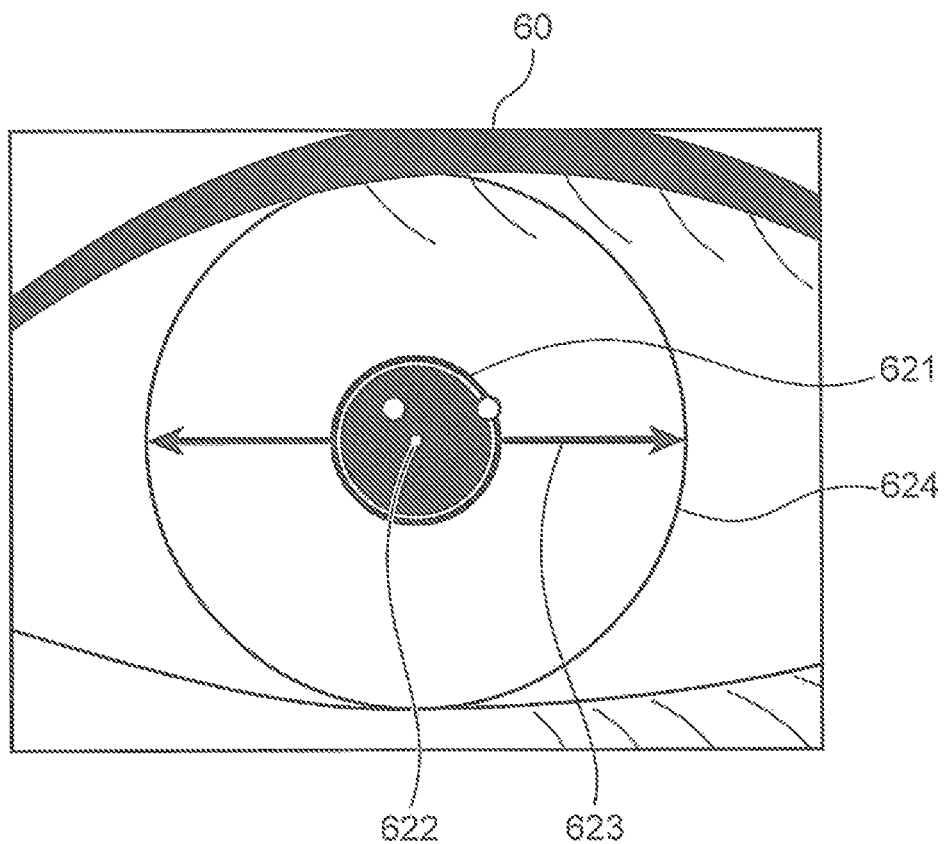
FIG. 12 is a view for explaining iris outer edge detection processing.

FIG. 12 is a view for explaining the iris outer edge detection processing. Specifically, in the iris outer edge detection processing, the pupil information detection unit 125 uses the second region 60 before binarization. First, the pupil information detection unit 125 sets, in the second region 60, a pupil outer edge 621 and a center 622 of the pupil that are detected by the pupil detection processing. Next, the pupil information detection unit 125 sets a search range with reference to a horizontal line 623 passing through the center 622. The search range is, for example, a region from the pupil outer edge 621 to a circle having a predetermined iris maximum radius, and is a region within a range of 22.5 degrees above and below the horizontal line 623.

Next, the pupil information detection unit 125 sets a region having a minute width in the radial direction about the pupil outer edge 621 within the search range. Next, the pupil information detection unit 125 obtains, by multiple integral, the total value of the luminance of the region having the minute width having been set. Next, the pupil information detection unit 125 sets a region having a minute width by radially expanding, by one pixel, the region having the minute width having been set immediately before, and obtains, by multiple integral, the total value of the luminance of the region having the minute width. Next, the pupil information detection unit 125 repeatedly executes this processing up to a predetermined iris maximum radius. This gives a function indicating the relationship between the plurality of radii and the total value of the luminance corresponding to each of the plurality of radii. Next, the pupil information detection unit 125 partially differentiates this function with respect to the radius, obtains the maximum change amount of the total value of the luminance of the adjacent radii, and detects, as an iris outer edge 624, the circle of the radius at the position where the maximum change amount is detected. As described above, the processing of detecting the pupil information shown in step S5 in a case where the image data is the image data captured by the infrared light camera ends. In this case, the pupil information may include, for example, coordinate data of the iris outer edge and coordinate data of the center of the iris that have been detected by the iris outer edge detection processing, and coordinate data of the pupil outer edge detected by the pupil detection processing, or may further include coordinate data of the center of the pupil in addition to these data.

Conventionally, Haugh circle detection processing is widely used as the pupil outer edge detection processing. However, there is a case where the pupil of the person 400 included in the image data is not only a perfect circle but also distorted. In addition, there is also a case where the person 400 included in the image data narrows the eye and a case where the person 400 included in the image data turns the face sideways. In these cases, since the pupil is not a perfect circle, there is a possibility that the pupil outer edge cannot be accurately detected by Haugh circle detection processing. The same is true for a case where Haugh circle detection processing is applied in the iris outer edge detection processing.

Therefore, in the present embodiment, pupil outer edge detection processing and iris outer edge detection processing using a part of Daugman algorithm are adopted. This enhances, in the present embodiment, robustness with respect to the pupil outer edge detection processing and the iris outer edge detection processing in various cases such as a case where the pupil is distorted from a perfect circle, a case of a narrowed eye, and a case of turning the face sideways.

However, as an adverse effect of the pupil outer edge detection processing and the iris outer edge detection processing using Daugman algorithm, an object similar to the pupil or the iris, such as the frame of glasses, is sometimes erroneously detected as a pupil outer edge or an iris outer edge. Therefore, in the present embodiment, processing for detecting pupil information is executed on the second region 60 set by narrowing the first region 50. Thus, in the present embodiment, the above adverse effect is overcome.

Refer back to FIG. 3. In step S6, the eye gaze information detection unit 140 outputs the pupil information detected in step S5. Here, the pupil information is output to the eye gaze information detection unit 140. However, this is an example, and the pupil information may be output to the display device 300.

In step S7, the eye gaze information detection unit 140 detects the eye gaze information based on the pupil information and the face orientation indicated by the face orientation information detected in step S9. A specific example of the detection processing of eye gaze information is as described above. In step S8, the eye gaze information detection unit 140 outputs the eye gaze information to the display device 300.

Figure 13:
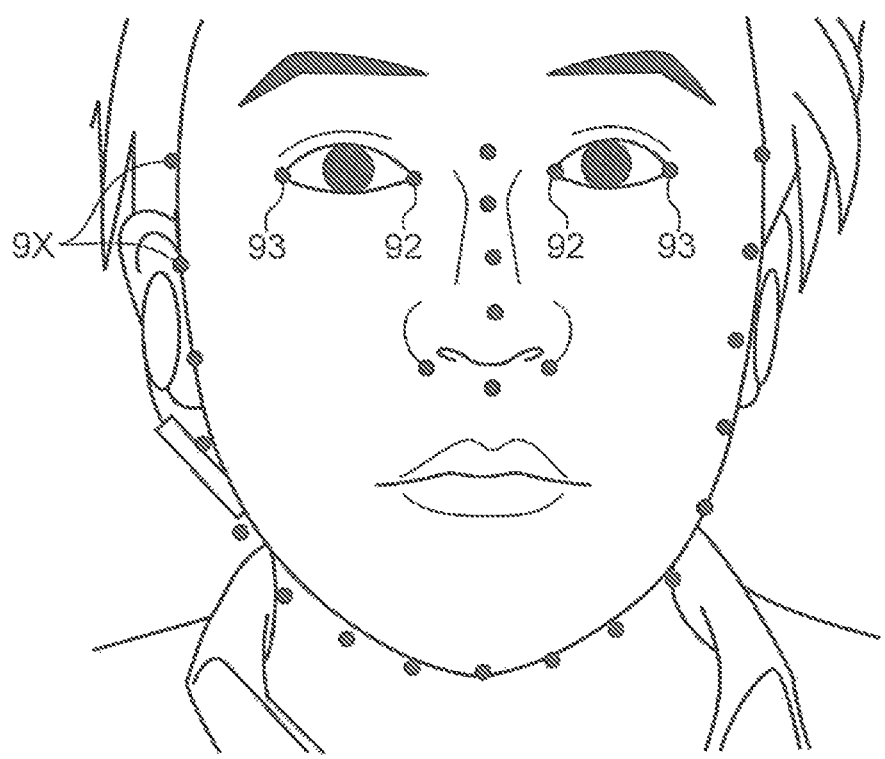
FIG. 13 is a view showing facial feature points set for a face region.

In step S9, the face orientation detection unit 130 detects the face orientation information. The face orientation detection unit 130 detects the face orientation information by the following processing. Note that step S9 is performed in parallel with the processing of steps S3 to S6. In particular, when the third criterion is used to set the second region, step S9 may be performed in parallel with the processing of step S3. FIG. 13 is a view showing facial feature points 9X set for the face region. As shown in FIG. 13, a plurality of feature points 9X are detected from the face region by applying the landmark detection processing to the face region. The example of FIG. 13 shows, among the feature points 9X detected by the landmark detection processing, the feature point 9X necessary for detection of the eye gaze information. In the example of FIG. 13, for example, five feature points 9X positioned on the ridge of the nose, for example, two feature points 9X positioned on the lower side of the nose, and, for example, 17 feature points 9X positioned on the contour of the face are detected. Furthermore, in the example of FIG. 13, two feature points 9X positioned at the left and right inner corners 92 of the eye and two feature points 9X positioned at the left and right outer corners 93 of the eye are detected. Note that a landmark point number is imparted to each of the feature points 9X, and it is predetermined which site of the face the feature point with which landmark point number indicates. For example, a landmark point number is set for each feature point 9X in such a manner that the feature point 9X with the landmark point number "2" indicates the left outer corner 93 of the eye, and the feature point with the landmark point number "0" indicates the left inner corner 92 of the eye. Therefore, from the landmark point number, the face orientation detection unit 130 can specify which site of the face the feature point 9X indicates.

Figure 14:
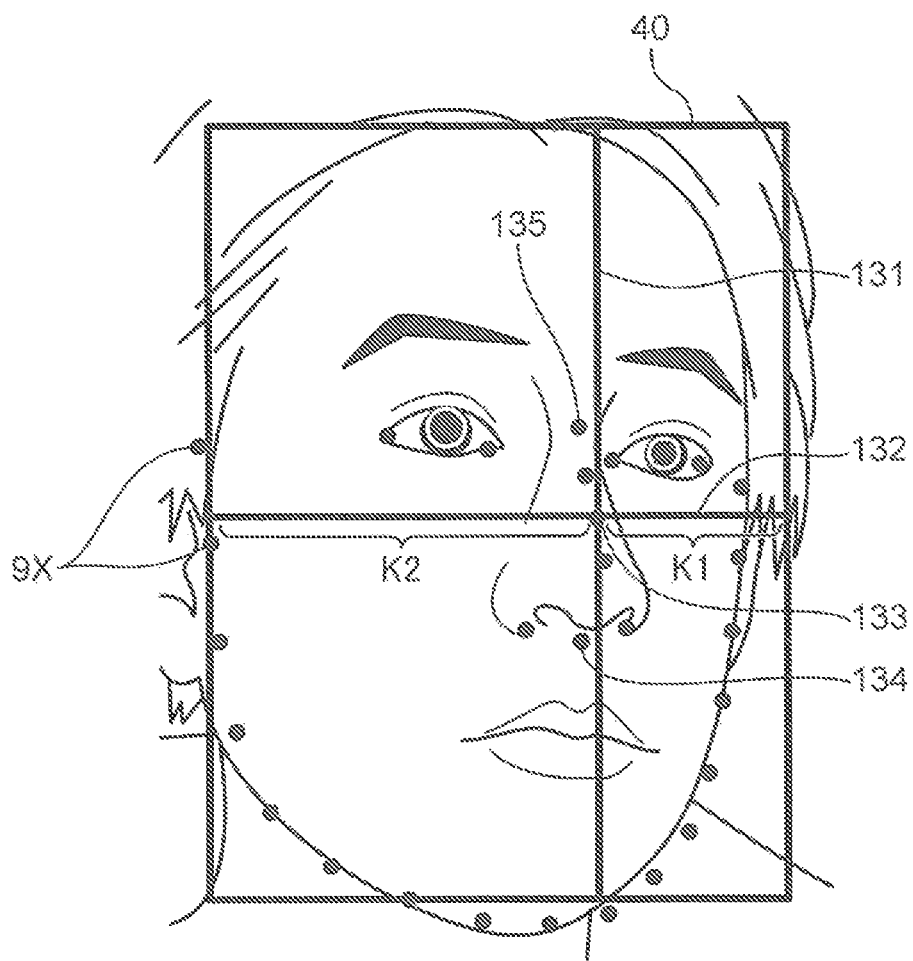
FIG. 14 is an explanatory view of processing for detecting face orientation information.

Next, the face orientation detection unit 130 executes the following processing from an array pattern of the facial feature points 9X to detect the face orientation information. FIG. 14 is an explanatory view of the processing for detecting the face orientation information. First, the face orientation detection unit 130 sets a vertical center line 131 in the vertical direction and a horizontal center line 132 in the horizontal direction from the facial feature point 9X set in the face region 40. For example, the face orientation detection unit 130 is only required to set, as the vertical center line 131, a straight line that passes through a feature point 133 indicating the center of the ridge of the nose and is parallel to the vertical side of the face region 40. The feature point 133 is, for example, the third feature point 9X from the top among the five feature points 9X indicating the ridge of the nose. Furthermore, the face orientation detection unit 130 is only required to set, as the horizontal center line 132, a straight line that passes through the feature point 133, for example, and is parallel to the horizontal side of the face region 40. Note that the vertical center line 131 and the horizontal center line 132 are described to pass through the feature point 133 at the center of the ridge of the nose, but they may be set to pass through a feature point 134 at the lower end of the ridge of the nose, for example, or may be set to pass through a feature point 135 at the upper end of the ridge of the nose.

Next, the face orientation detection unit 130 sections the horizontal center line 132 by the feature point 133, and obtains a length of a right section K1 and a length of a left section K2. Next, the face orientation detection unit 130 obtains a ratio between the right section K1 and the left section K2 where the length of the horizontal center line 132 is set to 100%, and obtains a face orientation degree based on this ratio. Assuming that the ratio of the right section K1 is K1 and the ratio of the left section K2 is K2, the face orientation degree can be calculated by $-(K1-K2)$, for example. In this formula, the minus sign at the head is a sign for making the face orientation degree positive in the case of the rightward orientation. For example, provided that K1=30% and K2=70%, the face orientation degree is $-(30-70)=40$. For example, provided that K1=70% and K2=30%, the face orientation degree is $-(70-30)=-40$. For example, provided that K1=50% and K2=50%, the face orientation degree is $-(50-50)=0$.

Therefore, as the value of the face orientation degree increases in the positive direction, it indicates that the face orientation is more rightward. As the value of the face orientation degree increases in the negative direction, it indicates that the face orientation is more leftward. In addition, when the face orientation degree is 0, it indicates that the face orientation is the front direction.

The face orientation detection unit 130 detects, as the face orientation information, the value of the face orientation degree obtained in this manner. Note that, the face orientation degree is calculated here by $-(K1-K2)$, but this is merely an example, and another mathematical formula may be adopted. For example, in order to make the leftward orientation positive, the face orientation degree may be calculated by −(K2-K1). Thus, any formula may be adopted as the arithmetic formula of the face orientation degree as long as the formula can indicate the degree of the face orientation.

As described above, according to the present embodiment, the second region 60 estimated to include the pupil or the iris is set by narrowing the first region 50 based on the first to third criteria, and the pupil information is detected in the second region 60. Thus, even if the first region 50 includes information that is highly likely to be erroneously detected as a pupil or an iris, such as a frame of glasses, a region in which such information is omitted from the first region 50 is more likely to be set as the second region 60. Therefore, the present embodiment can improve the detection accuracy of the pupil or the iris. As a result, the present embodiment can accurately specify the center position of the pupil or the iris, and can eventually improve the detection accuracy of the eye gaze performed using these pieces of information.

Second Embodiment

Figure 15:
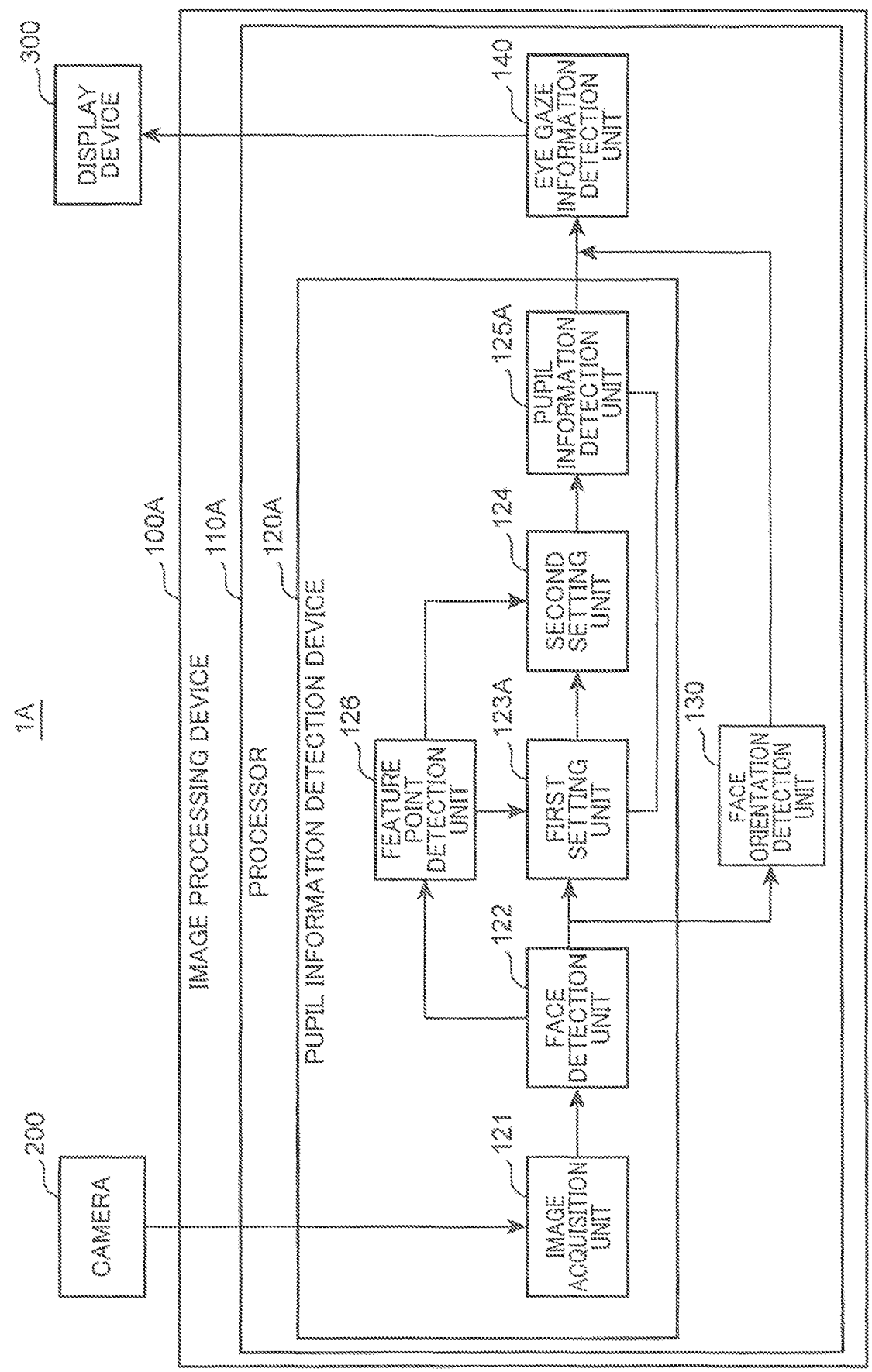
FIG. 15 is a block diagram showing an example of a detailed configuration of the image processing system according to a second embodiment.

In the second embodiment, when the outer corner of the eye and the inner corner of the eye has been detected from the face region 40, a region that surrounds the outer corner of the eye and the inner corner of the eye and is smaller than the first region 50, set when having failed to detect the outer corner of the eye and the inner corner of the eye, is set as the first region 50. In the second embodiment, identical components as those in the first embodiment are given identical reference numerals, and description thereof will be omitted. FIG. 15 is a block diagram showing an example of a detailed configuration of the image processing system 1A according to the second embodiment. Note that, in FIG. 15, a block having an identical name as that in FIG. 2 but having a different function is given a reference sign A at the end.

A pupil information detection device 120A is provided in a processor 110A of an image processing device 100A. In the pupil information detection device 120A, a difference from FIG. 2 lies in a first setting unit 123A and a pupil information detection unit 125A. The first setting unit 123A determines whether or not feature points indicating the outer corner of the eye and the inner corner of the eye are included in the feature points detected in a face region by the feature point detection unit 126. Here, when there is a feature point having a landmark point number corresponding to each of the outer corner of the eye and the inner corner of the eye at the facial feature point detected by the feature point detection unit 126, the first setting unit 123A is only required to determine that the outer corner of the eye and the inner corner of the eye have been detected. Then, when the outer corner of the eye and the inner corner of the eye have been detected, the first setting unit 123A is only required to set, as the first region 50, a region surrounding the outer corner of the eye and the inner corner of the eye in the face region 40. Here, the first region 50 to be set is smaller than the first region 50 to be set in a case where the outer corner of the eye and the inner corner of the eye are not detected.

As a setting method of the first region 50 in a case where the outer corner of the eye and the inner corner of the eye have been detected, a method according to the setting method of the second region 90 based on the third criterion can be adopted. Refer to FIG. 8. For example, the first setting unit 123A is only required to set the first region 50 such that the vertical side J1 passes through the inner corner 92 of the eye and the vertical side J2 passes through the outer corner 93 of the eye. At this time, the first setting unit 123A may set the horizontal side J3 to a position separated downward by a predetermined distance from the horizontal side H4, or may set the horizontal side J3 on the horizontal side H4. Furthermore, the first setting unit 123A may set the horizontal side J4 to a position separated upward by a predetermined distance from the horizontal side H5, or may set the horizontal side J4 on the horizontal side H5. Alternatively, the first setting unit 123A may set the vertical side J1 slightly on the nose side with respect to the inner corner 92 of the eye, or may set the vertical side J2 slightly on the ear side with respect to the outer corner 93 of the eye.

In a case where the outer corner of the eye and the inner corner of the eye are detected by the first setting unit 123A, the pupil information detection unit 125 executes processing for detecting pupil information with respect to the first region 50 set based on the detection result. On the other hand, in a case where the outer corner of the eye and the inner corner of the eye are not detected by the first setting unit 123A, processing for detecting pupil information is executed on the second region 60 as in the first embodiment.

Figure 16:
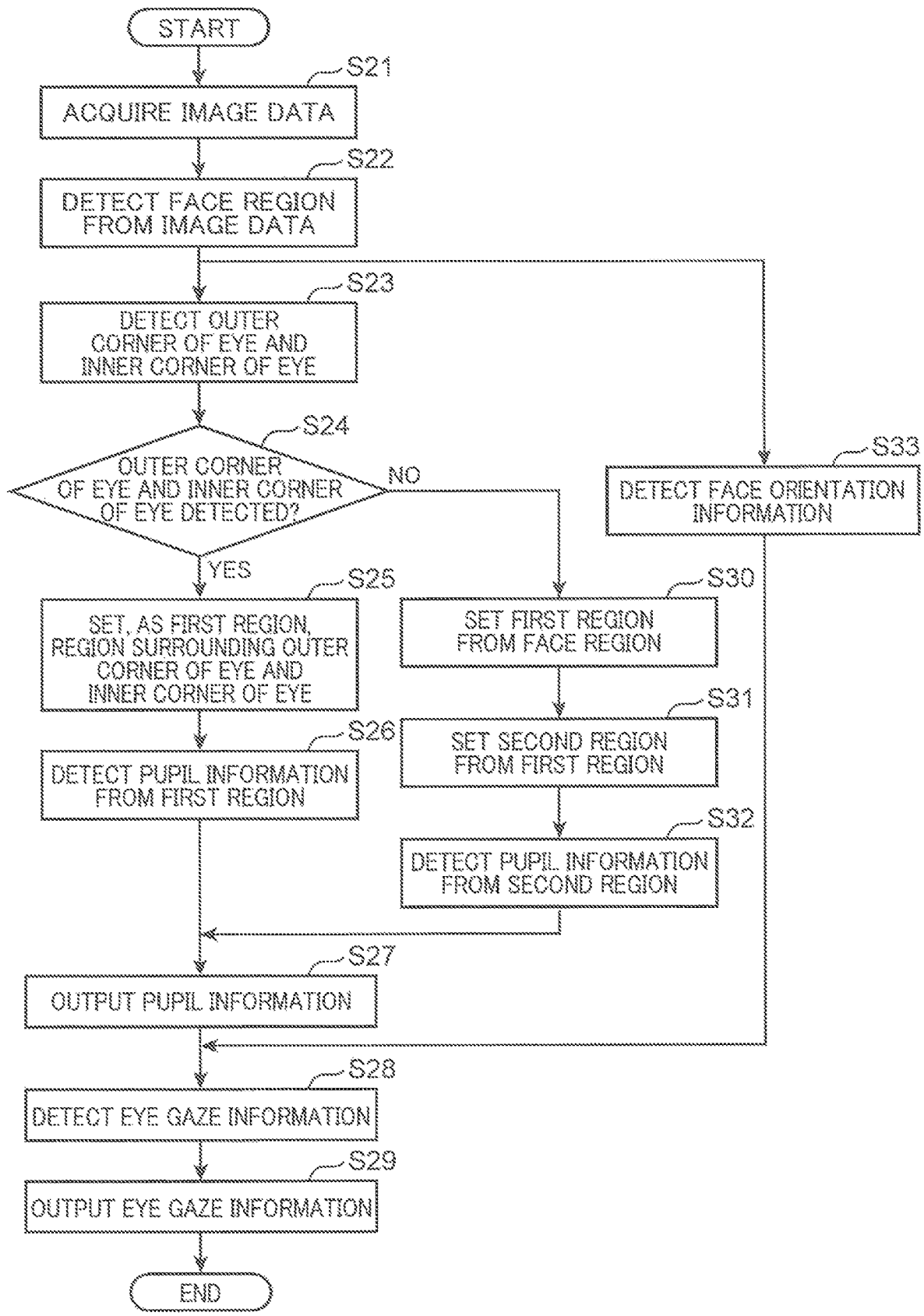
FIG. 16 is a flowchart showing an example of an operation of an image processing device according to the second embodiment.

Next, the operation of the image processing device 100A will be described. FIG. 16 is a flowchart showing an example of the operation of the image processing device 100A according to the second embodiment. The processing in steps S21 and S22 is the same as that in steps S1 and S2 in FIG. 3.

In step S23, the first setting unit 123A detects the outer corner of the eye and the inner corner of the eye from the face region 40 using the feature points detected by the feature point detection unit 126.

In step S24, the first setting unit 123A determines whether or not the outer corner of the eye and the inner corner of the eye have been detected. When the outer corner of the eye and the inner corner of the eye have been detected (YES in step S24), the first setting unit 123A sets a region surrounding the outer corner of the eye and the inner corner of the eye as the first region 50 (step S25).

In step S26, the pupil information detection unit 125A detects pupil information from the first region 50 set in step S5.

On the other hand, when the outer corner of the eye and the inner corner of the eye are not detected in step S24 (NO in step S24), the first setting unit 123A proceeds with the processing to step S30. The processing in steps S30 to S32 is the same as that in steps S3 to S5 in FIG. 3. The processing in steps S27 to S29 and S33 is the same as that in steps S6 to S8 and S9 in FIG. 3.

As described above, according to the second embodiment, when the outer corner of the eye and the inner corner of the eye have been detected from the face region 40, the processing for detecting pupil information is executed on the first region 50. Therefore, in the present embodiment, it is possible to execute the processing for detecting pupil information on the first region 50 without setting the second region 60. The first region 50 is a region surrounding the outer corner of the eye and the inner corner of the eye. Therefore, in the present embodiment, it is possible to set, as the first region 50, a region in which information that is highly likely to be erroneously detected as a pupil or an iris, such as a frame of glasses, is omitted, and to accurately detect pupil information. Furthermore, it is possible to accurately detect the pupil information by adaptively switching the detection method of pupil information according to whether or not the outer corner of the eye and the inner corner of the eye have been detected, in such a manner that the pupil information is detected by the method of the second embodiment in a case where the outer corner of the eye and the inner corner of the eye are detected and the pupil information is detected by the method of the first embodiment in a case where the outer corner of the eye and the inner corner of the eye are not detected.

Third Embodiment

Figure 17:
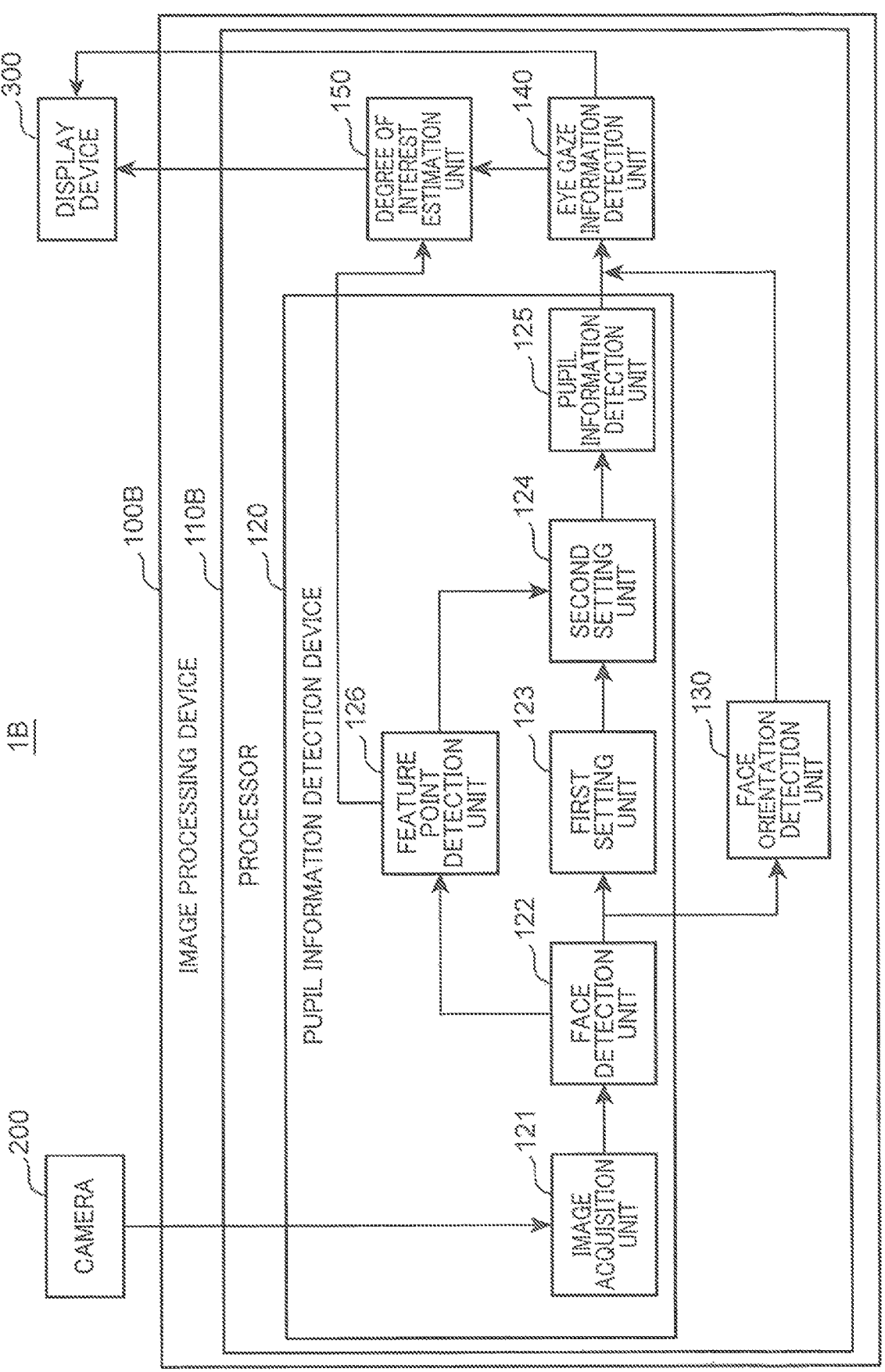
FIG. 17 is a block diagram showing a detailed configuration of an image processing system according to a third embodiment.

In the third embodiment, the degree of interest of the person 400 is estimated. FIG. 17 is a block diagram showing a detailed configuration of an image processing system 1B according to the third embodiment. In the present embodiment, identical components as those in the first and second embodiments are given identical reference numerals, and description thereof will be omitted. Furthermore, in FIG. 17, a block having an identical name as that in FIG. 2 but having a different function is given a reference sign B at the end.

A processor 110B further includes a degree of interest estimation unit 150. The degree of interest estimation unit 150 estimates the degree of interest of the person 400 by the following processing. First, the degree of interest estimation unit 150 detects an eyebrow and a corner of the mouth from the face region 40 using the facial feature point 9X detected by the feature point detection unit 126. Here, the degree of interest estimation unit 150 is only required to detect the eyebrow and the corner of the mouth by specifying the feature points 9X to which the landmark point numbers respectively corresponding to the eyebrow and the corner of the mouth are imparted among the facial feature points 9X detected by the feature point detection unit 126.

Next, the degree of interest estimation unit 150 estimates the degree of interest of the person 400 based on the eye gaze information detected by the eye gaze information detection unit 140 and the position of the eyebrow and the position of the corner of the mouth having been detected, and outputs the degree of interest to the display device 300. Specifically, the degree of interest estimation unit 150 acquires, from a memory (not illustrated) for example, pattern data in which standard positions of the eyebrow and the corner of the mouth when a person puts on various expressions such as joy, surprise, anger, sadness, and blankness are described in advance. Then, the degree of interest estimation unit 150 collates the detected positions of the eyebrow and the corner of the mouth of the person 400 with the pattern data, and estimates the expression of the person 400. Then, using the estimated expression of the person 400 and the eye gaze indicated by the eye gaze information, the degree of interest estimation unit 150 specifies what expression the person 400 has made when the eye gaze of the person 400 is in which direction or the eye gaze point of the person 400 is present in which position. That is, the degree of interest estimation unit 150 specifies, as the degree of interest of the person 400, data in which the eye gaze information of the person 400 and the expression of the person 400 are associated with each other. Note that, the degree of interest estimation unit 150 is described here to estimate the degree of interest based on the eyebrow and the corner of the mouth, but this is an example, and the degree of interest may be estimated based on one of the eyebrow and the corner of the mouth.

As described above, according to the present embodiment, since the degree of interest of the person 400 is estimated by further using the eyebrow and the corner of the mouth in addition to the eye gaze information, the degree of interest can be estimated with higher accuracy as compared with the degree of interest estimation based only on the eye gaze information.

Modifications (1) If an infrared light camera is adopted as the camera 200, the infrared light camera is only required to be an infrared light camera using infrared light in a predetermined second wavelength band in which the spectral intensity of sunlight is attenuated more than a predetermined first wavelength. The predetermined first wavelength is, for example, 850 nm. The predetermined second wavelength is, for example, 940 nm. The second wavelength band does not include, for example, 850 nm and is a band having a predetermined width with 940 nm as a reference (e.g., the center). As an infrared light camera that captures near-infrared light, one that uses infrared light of 850 nm is known. However, since the spectral intensity of sunlight is not sufficiently attenuated at 850 nm, there is a possibility that highly accurate eye gaze detection cannot be performed outdoors where the spectral intensity of sunlight is strong. Therefore, as an infrared light camera, the present disclosure employs a camera that uses infrared light in a band of 940 nm, for example. This makes it possible to perform highly accurate eye gaze detection even outdoors where the spectral intensity of sunlight is strong. Here, the predetermined second wavelength is 940 nm, but this is an example, and may be a wavelength slightly shifted from 940 nm. Note that the infrared light camera using the infrared light of the second wavelength is, for example, a camera including a light projector that irradiates with the infrared light of the second wavelength.

(2) In the above embodiment, the eye gaze information is described to include the coordinate data indicating the eye gaze point, but the present disclosure is not limited thereto. For example, the eye gaze information may include coordinate data indicating an eye gaze plane that is a region having a predetermined shape (e.g., a circle, a quadrangle, or the like) with a predetermined size with the eye gaze point as a reference (e.g., the center). This makes it possible to appropriately determine the eye gaze target object without depending on the distance between the person and the eye gaze target object or the size of the eye gaze target object.

(3) In the first embodiment, when the second region 90 is set using the third criterion, the second setting unit 124, in some cases, can detect the outer corner of the eye and the inner corner of the eye in one eye of the right and left eyes and cannot detect the outer corner of the eye and the inner corner of the eye in the other eye. In this case, the second setting unit 124 may determine that it has failed to detect the outer corner of the eye and the inner corner of the eye. Alternatively, the second setting unit 124 is only required to set the second region 90 only for one eye based on the third criterion, and set the second region 60 for the other eye based on the first criterion or the second criterion.

(4) In the second embodiment, when the first region 50 is set so as to surround the outer corner of the eye and the inner corner of the eye, in some cases, the outer corner of the eye and the inner corner of the eye can be detected in one of the right and left eyes and the outer corner of the eye and the inner corner of the eye cannot be detected in the other eye. In this case, the first setting unit 123A may determine that it has failed to detect the outer corner of the eye and the inner corner of the eye. Alternatively, the first setting unit 123A is only required to set the first region 50 only for one eye by the method described in the second embodiment, and set the first region 50 for the other eye by using the method described in the first embodiment.

INDUSTRIAL APPLICABILITY

Since the present disclosure can detect pupil information and eye gaze information with high accuracy, the present disclosure is useful in iris authentication using pupil information, estimation of a person's interest target using eye gaze information, estimation of a person's state, a user interface using an eye gaze, and the like.

The invention claimed is:

1. An image processing method of detecting pupil information in an image processing device, the image processing method comprising:
acquiring image data;
detecting a face region including at least a part of a face of a person from the image data;
setting a first region used for detection of an eye of the person in the face region having been detected;
setting a second region estimated to include a pupil or an iris by narrowing the first region based on a predetermined criterion;
detecting pupil information indicating the pupil or the iris in the second region;
outputting the pupil information having been detected; and
detecting face orientation information indicating an orientation of a face of the person from the face region;
wherein the predetermined criterion is a criterion for removing, in the first region, a predetermined amount of area from a boundary side of the first region, and
wherein in setting of the second region,
as a rightward orientation degree of the face indicated by the face orientation information becomes greater, an exclusion width from a right boundary in the first region is made narrower and an exclusion width from a left boundary in the first region is made wider, and
as a leftward orientation degree of the face indicated by the face orientation information becomes greater, an exclusion width from a left boundary in the first region is made narrower and an exclusion width from a right boundary in the first region is made wider.

2. The image processing method according to claim 1, further comprising:
detecting a facial feature point from the face region having been detected;
detecting face orientation information indicating an orientation of a face of the person based on the facial feature point;
detecting eye gaze information indicating an eye gaze of the person based on the pupil information and the face orientation information having been detected; and
outputting the eye gaze information having been detected.

3. The image processing method according to claim 2, wherein the eye gaze information includes information indicating an eye gaze plane that is a region of a predetermined range with respect to an eye gaze point of the person on a predetermined target plane.

4. The image processing method according to claim 1, wherein
the image data is captured by a visible light camera, and
the pupil information includes information indicating a center position of the iris and a size of the iris.

5. The image processing method according to claim 1, wherein
the image data is captured by an infrared light camera, and
the pupil information includes at least one of information indicating a center position of the pupil and a size of the pupil and information indicating a center position of the iris and a size of the iris.

6. The image processing method according to claim 5, wherein the image data is image data captured by an infrared light camera using infrared light in a predetermined second wavelength band in which a spectral intensity of sunlight is attenuated more than a predetermined first wavelength.

7. An image processing method of detecting pupil information in an image processing device, the image processing method comprising:
acquiring image data;
detecting a face region including at least a part of a face of a person from the image data;
setting a first region used for detection of an eye of the person in the face region having been detected;
setting a second region estimated to include a pupil or an iris by narrowing the first region based on a predetermined criterion;
detecting pupil information indicating the pupil or the iris in the second region;
outputting the pupil information having been detected;
detecting an outer corner of an eye and an inner corner of an eye from the face region having been detected, wherein
when the outer corner of the eye and the inner corner of the eye have been detected,
a region that surrounds the outer corner of the eye and the inner corner of the eye and is smaller than a first region set in a case of having failed to detect the outer corner of the eye and the inner corner of the eye is set as the first region in setting of the first region, and
the pupil information is detected in the first region in detection of the pupil information.

8. An image processing method of detecting pupil information in an image processing device, the image processing method comprising:
acquiring image data;
detecting a face region including at least a part of a face of a person from the image data;
setting a first region used for detection of an eye of the person in the face region having been detected;
setting a second region estimated to include a pupil or an iris by narrowing the first region based on a predetermined criterion;
detecting pupil information indicating the pupil or the iris in the second region; and
outputting the pupil information having been detected;
detecting a facial feature point from the face region having been detected;
detecting face orientation information indicating an orientation of a face of the person based on the facial feature point;
detecting eye gaze information indicating an eye gaze of the person based on the pupil information and the face orientation information having been detected;

outputting the eye gaze information having been detected
  detecting at least one of an eyebrow and a corner of a
  mouth from the face region having been detected; and
estimating a degree of interest of the person based on the
  eye gaze information and at least one of a position of
  the eyebrow having been detected and a position of the
  corner of the mouth having been detected.

9. The image processing method according to claim 8, further comprising:
estimating an expression of the person based on at least
  one of a position of the eyebrow having been detected
  and a position of the corner of the mouth having been
  detected; and
estimating a degree of interest of the person based on the
  eye gaze information and information indicating the
  estimated expression.

10. An image processing device comprising:
a memory; and
a processor that executes a program from the memory so
  as to operate as:
an acquisition unit acquiring image data;
a face detection unit detecting a face region including an
  entire or part of a face of a person from the image data;
a first setting unit setting a first region used for detection
  of an eye of the person in the face region having been
  detected;
a second setting unit setting a second region estimated to
  include a pupil or an iris by narrowing the first region
  based on a predetermined criterion;
a face orientation detection unit detecting face orientation
  information indicating an orientation of a face of the
  person from the face region; and
a pupil information detection unit detecting pupil information indicating the pupil or the iris in the second
  region, and outputting the pupil information,
wherein the predetermined criterion is a criterion for
  removing, in the first region, a predetermined amount
  of area from a boundary side of the first region, and
wherein in setting of the second region,
  as a rightward orientation degree of the face indicated
    by the face orientation information becomes greater,
    an exclusion width from a right boundary in the first
    region is made narrower and an exclusion width
    from a left boundary in the first region is made wider,
    and
  as a leftward orientation degree of the face indicated by
    the face orientation information becomes greater, an
    exclusion width from a left boundary in the first
    region is made narrower and an exclusion width
    from a right boundary in the first region is made
    wider.

11. A non-transitory computer readable storage medium storing an image processing program for causing a computer to function as:
an acquisition unit acquiring image data;
a face detection unit detecting a face region including an
  entire or part of a face of a person from the image data;
a first setting unit setting a first region used for detection
  of an eye of the person in the face region having been
  detected;
a second setting unit setting a second region estimated to
  include a pupil or an iris by narrowing the first region
  based on a predetermined criterion;
a face orientation detection unit detecting face orientation
  information indicating an orientation of a face of the
  person from the face region; and
a pupil information detection unit detecting pupil information indicating the pupil or the iris in the second
  region, and outputting the pupil information,
wherein the predetermined criterion is a criterion for
  removing, in the first region, a predetermined amount
  of area from a boundary side of the first region, and
wherein in setting of the second region,
  as a rightward orientation degree of the face indicated
    by the face orientation information becomes greater,
    an exclusion width from a right boundary in the first
    region is made narrower and an exclusion width
    from a left boundary in the first region is made wider,
    and
  as a leftward orientation degree of the face indicated by
    the face orientation information becomes greater, an
    exclusion width from a left boundary in the first region
    is made narrower and an exclusion width from a right
    boundary in the first region is made wider.

12. An image processing device comprising:
a memory; and
a processor that executes a program from the memory so
  as to operate as:
an acquisition unit acquiring image data;
a face detection unit detecting a face region including an
  entire or part of a face of a person from the image data;
a first setting unit setting a first region used for detection
  of an eye of the person in the face region having been
  detected;
a second setting unit setting a second region estimated to
  include a pupil or an iris by narrowing the first region
  based on a predetermined criterion; and
a pupil information detection unit detecting pupil information indicating the pupil or the iris in the second
  region, and outputting the pupil information,
wherein, the first setting unit detects an outer corner of an
  eye and an inner corner of an eye from the face region
  having been detected,
when the outer corner of the eye and the inner corner of
  the eye have been detected, the first setting unit sets a
  region that surrounds the outer corner of the eye and the
  inner corner of the eye and is smaller than a first region
  set in a case of having failed to detect the outer corner
  of the eye and the inner corner of the eye is set as the
  first region in setting of the first region, and
the pupil information detection unit detects the pupil
  information in the first region.

13. A non-transitory computer readable storage medium storing an image processing program for causing a computer to function as:
an acquisition unit acquiring image data;
a face detection unit detecting a face region including an
  entire or part of a face of a person from the image data;
a first setting unit setting a first region used for detection
  of an eye of the person in the face region having been
  detected;
a second setting unit setting a second region estimated to
  include a pupil or an iris by narrowing the first region
  based on a predetermined criterion; and
a pupil information detection unit detecting pupil information indicating the pupil or the iris in the second
  region, and outputting the pupil information,
wherein, the first setting unit detects an outer corner of an
  eye and an inner corner of an eye from the face region
  having been detected,
when the outer corner of the eye and the inner corner of
  the eye have been detected, the first setting unit sets a
  region that surrounds the outer corner of the eye and the inner corner of the eye and is smaller than a first region set in a case of having failed to detect the outer corner of the eye and the inner corner of the eye is set as the first region in setting of the first region, and the pupil information detection unit detects the pupil information in the first region.

14. An image processing device comprising:

a memory; and a processor that executes a program from the memory so as to operate as:

an acquisition unit acquiring image data;

a face detection unit detecting a face region including an entire or part of a face of a person from the image data;

a first setting unit setting a first region used for detection of an eye of the person in the face region having been detected;

a second setting unit setting a second region estimated to include a pupil or an iris by narrowing the first region based on a predetermined criterion;

a pupil information detection unit detecting pupil information indicating the pupil or the iris in the second region, and outputting the pupil information;

a feature point detection unit detecting a facial feature point from the face region having been detected;

a face orientation detection unit detecting face orientation information indicating an orientation of a face of the person based on the facial feature point;

an eye gaze information detection unit detecting eye gaze information indicating an eye gaze of the person based on the pupil information and the face orientation information having been detected, and outputting the eye gaze information having been detected; and a degree of interest estimation unit detecting at least one of an eyebrow and a corner of a mouth from the face region having been detected, and estimating a degree of interest of the person based on the eye gaze information and at least one of a position of the eyebrow having been detected and a position of the corner of the mouth having been detected.

15. A non-transitory computer readable storage medium storing an image processing program for causing a computer to function as:

an acquisition unit acquiring image data;

a face detection unit detecting a face region including an entire or part of a face of a person from the image data;

a first setting unit setting a first region used for detection of an eye of the person in the face region having been detected;

a second setting unit setting a second region estimated to include a pupil or an iris by narrowing the first region based on a predetermined criterion;

a pupil information detection unit detecting pupil information indicating the pupil or the iris in the second region, and outputting the pupil information;

a feature point detection unit detecting a facial feature point from the face region having been detected;

a face orientation detection unit detecting face orientation information indicating an orientation of a face of the person based on the facial feature point;

an eye gaze information detection unit detecting eye gaze information indicating an eye gaze of the person based on the pupil information and the face orientation information having been detected, and outputting the eye gaze information having been detected; and a degree of interest estimation unit detecting at least one of an eyebrow and a corner of a mouth from the face region having been detected, and estimating a degree of interest of the person based on the eye gaze information and at least one of a position of the eyebrow having been detected and a position of the corner of the mouth having been detected.

* * * * *